US011522685B2

(12) United States Patent
Tanji et al.

(10) Patent No.: US 11,522,685 B2
(45) Date of Patent: Dec. 6, 2022

(54) KEY MANAGEMENT SYSTEM, COMMUNICATION DEVICE AND KEY SHARING METHOD

(71) Applicant: Mitsubishi Electric Corporation, Tokyo (JP)

(72) Inventors: Masamichi Tanji, Tokyo (JP); Makoto Itoi, Tokyo (JP); Nobuhiro Kobayashi, Tokyo (JP); Teruyoshi Yamaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 197 days.

(21) Appl. No.: 16/603,730

(22) PCT Filed: Apr. 14, 2017

(86) PCT No.: PCT/JP2017/015303
§ 371 (c)(1),
(2) Date: Oct. 8, 2019

(87) PCT Pub. No.: WO2018/189885
PCT Pub. Date: Oct. 18, 2018

(65) Prior Publication Data
US 2021/0111874 A1    Apr. 15, 2021

(51) Int. Cl.
*H04L 9/08* (2006.01)
*H04L 9/32* (2006.01)
(Continued)

(52) U.S. Cl.
CPC ............ *H04L 9/083* (2013.01); *H04L 9/0822* (2013.01); *H04L 9/0866* (2013.01);
(Continued)

(58) Field of Classification Search
None
See application file for complete search history.

(56) References Cited

U.S. PATENT DOCUMENTS

2009/0204806 A1\* 8/2009 Kanemura ............ H04L 9/0822
  713/155
2016/0315766 A1   10/2016 Ujiie et al.
(Continued)

FOREIGN PATENT DOCUMENTS

CN          105794146 A    7/2016
EP            1603044 B1 \*  5/2016  ............ G06F 21/10
(Continued)

OTHER PUBLICATIONS

Specification of Module Secure Onboard Communication AUTOSAR Release 4.2.2; 1 page.
(Continued)

*Primary Examiner* — Brandon Hoffman
*Assistant Examiner* — Mayasa A. Shaawat
(74) *Attorney, Agent, or Firm* — Sughrue Mion, PLLC

(57) ABSTRACT

A key management apparatus receives a key request including a first device identification information and a second device identification information, encrypts a common key using the first device identification information to generate a first encrypted common key, encrypts the common key using the second device identification information to generate a second encrypted common key, and transmits a key response including the first encrypted common key and the second encrypted common key. A first device receives the key response, decrypts the first encrypted common key using the first device identification information to obtain the common key, and transmits the second encrypted common key. A second device receives the second encrypted common key and decrypts the second encrypted common key using the second device identification information to obtain the common key.

20 Claims, 19 Drawing Sheets

(51) Int. Cl.
*H04L 67/12* (2022.01)
*H04L 9/40* (2022.01)

(52) U.S. Cl.
CPC ............ *H04L 9/3271* (2013.01); *H04L 67/12* (2013.01); *H04L 63/0869* (2013.01); *H04L 2209/84* (2013.01); *H04L 2463/062* (2013.01)

(56) References Cited

U.S. PATENT DOCUMENTS

| | | |
|---|---|---|
| 2020/0084025 A1 | 3/2020 | Ujiie et al. |
| 2021/0028925 A1 | 1/2021 | Ujiie et al. |

FOREIGN PATENT DOCUMENTS

| | | | | |
|---|---|---|---|---|
| JP | 2004-259262 A | | 9/2004 | |
| JP | 2008217497 A | * | 9/2008 | |
| JP | 5992104 B2 | * | 9/2016 | ........... H04L 9/0866 |
| JP | 5992104 B2 | | 9/2016 | |

OTHER PUBLICATIONS

International Search Report for PCT/JP2017/015303 dated Jul. 18, 2017 [PCT/ISA/210].
Communication dated Dec. 15, 2021 from The State Intellectual Property office of P R. of China Application No. 201780089401.0.

\* cited by examiner

KEY MANAGEMENT SYSTEM, COMMUNICATION DEVICE AND KEY SHARING METHOD

CROSS REFERENCE TO RELATED APPLICATIONS

This application is a National Stage of International Application No. PCT/JP2017/015303 filed Apr. 14, 2017.

TECHNICAL FIELD

The present invention relates to a key management technology for establishing secure communication.

BACKGROUND ART

At present, in the automobile industry, various driving support functions such as an automatic braking function and a lane keeping function are being developed to realize autonomous driving in the 2020s. These developed driving support functions are realized in automobiles.

From now on, it is expected that more advanced driving support functions will be realized by communicating with various external things such as a cloud, a roadside device and another vehicle.

On the other hand, when the vehicle communicates with the outside, a possibility of the vehicle being subjected to malicious attack is increased, and it is important to establishing secure communication.

As a technology related to such communication security, a method for performing authentication has been proposed. (See Non-Patent Literature 1).

In this method, it is assumed that a common key used for authentication is shared in advance between the transmitting device and the receiving device.

However, since automobiles are manufactured by assembling in-vehicle devices made by various manufacturers, it is difficult for each manufacturer to grasp communication relationship of the in-vehicle devices in advance, and it is difficult to set a key to the in-vehicle device when manufacturing the in-vehicle device. In addition, since the in-vehicle device may be replaced during operation, it is not sufficient to set the key to the in-vehicle device at the time of manufacture.

In order to cope with this, a method for distributing keys using public key cryptography has been proposed. (See Patent Literature 1)

However, since there are cost and resource limitations in the in-vehicle device, it is inevitable that there is the in-vehicle device that does not support public key cryptography. Therefore, it is difficult to apply the method according to Patent Literature 1 to all the in-vehicle devices.

Therefore, in Patent Literature 2, a method is proposed in which devices using common key cryptography and not sharing in advance a common key used for authentication securely share the common key.

When the method of Patent Literature 2 is used, for example, when a gateway (hereinafter referred to as GW) interconnecting networks using different protocol technologies provided in a vehicle of an automobile wants to perform device authentication of the in-vehicle devices, it is possible to realize the authentication by performing as follows:

(1) The GW receives manufacturer identification information (hereinafter referred to as ID) and a device ID from the in-vehicle device.

(2) The GW passes the manufacturer ID and the device ID of the in-vehicle device to a management server.

(3) The management server regenerates a manufacturer authentication key from a master key and the manufacturer ID held by itself.

(4) The management server regenerates an authentication key of the in-vehicle device using the regenerated manufacturer authentication key and the device ID.

(5) The management server transmits the regenerated authentication key to the GW.

(6) The GW performs mutual authentication with the in-vehicle device using the received authentication key.

According to the above, in the vehicle on which the in-vehicle devices of various manufacturers are mounted, it is possible to realize the authentication between the GW and each in-vehicle device even if the GW does not share the authentication key of each in-vehicle device in advance. In addition, since this method uses only common key cryptography, it can be applied to all the in-vehicle devices.

As a timing at which the GW shares the common key with the in-vehicle device using the method of Patent Literature 2, there are roughly two cases.

One is the case of assembling the vehicle at a factory of a car manufacturer. At this time, since the GW does not share a common key with any of the in-vehicle devices, it performs a key sharing process with all the in-vehicle devices.

The other is the case of adding a new in-vehicle device to the vehicle or replacing an existing in-vehicle device at a dealer or the like. In this case, in the in-vehicle device originally present in the vehicle, since the GW already shares the common key, it is only necessary to perform the key sharing process with the newly added in-vehicle device.

CITATION LIST

Non-Patent Literature

Non-Patent Literature 1: Specification OF Module Secure Onboard Communication, AUTOSAR Release 4.2.2

PATENT LITERATURE

Patent Literature 1: JP-A-2004-259262
Patent Literature 2: Japanese Patent No. 5992104

SUMMARY OF THE INVENTION

Technical Problem

By the way, in recent years, the number of in-vehicle devices mounted on the vehicle has increased, and there are vehicles mounted with one hundred or more in-vehicle devices in one vehicle.

Therefore, when assembling the vehicle in the factory of the car manufacturer, in order to realize key sharing with all the in-vehicle devices present in the vehicle using the method of Patent Literature 2, it is necessary to repeat the key sharing process of the above (1) to (5) by the number of in-vehicle devices.

As a result, the number of communication packets exchanged between the GW and the management server increases, and a processing time required for key sharing with all the in-vehicle devices in the vehicle increases. Therefore, an assembly work time of the vehicle in the factory increases, which causes a problem on production efficiency of the vehicle.

The present invention has been made to solve the above-mentioned problems, and an object thereof is to reduce the number of communication packets exchanged between the GW and the management server and shorten the processing time required for the key sharing process, when the GW performs key sharing with all in-vehicle devices present in the vehicle.

Means for Solving the Problems

A key management system according to the present invention is a key management system for communicating a master station having a key management apparatus and a slave station having a plurality of terminal devices via a network and sharing keys with them, wherein
the key management apparatus includes:
a receiving unit for receiving a key request including communication device identification information identifying a communication device of the slave station, multiple pieces of terminal device identification information respectively identifying the plurality of terminal devices communicating with the communication device, a challenge generated by the communication device, and a response respectively generated by the plurality of terminal devices using the respective terminal device unique key with respect to the challenge;
a device key generation unit for generating a communication device unique key of the communication device using the communication device identification information included in the key request, and generating the terminal device unique key of the plurality of terminal devices using the multiple pieces of terminal device identification information included in the key request;
an authentication information verification unit for verifying the challenge and the response using the generated terminal device unique key;
a common key generation unit for generating a common key shared by the communication device and the plurality of terminal devices when verification is successful by the authentication information verification unit;
an encrypted common key generation unit for generating an encrypted common key obtained by encrypting the common key with the communication device unique key and encrypting the common key with the terminal device unique key of the plurality of terminal devices;
a key response generation unit for generating a key response including the encrypted common key; and
a transmitting unit for transmitting the key response to the communication device.

A communication device according to the present invention is a communication device sharing a key between a plurality of first to N-th terminal devices provided in a product, wherein
the communication device has configuration information storing network information of each of the plurality of first to N-th terminal devices, and includes:
an information request unit for generating an information request and transmitting the information request to the first terminal device with reference to the configuration information;
a receiving unit for receiving an information response to the information request from the N-th terminal device;
a common key request unit for generating a key request from the information response and transmitting the key request to a key management apparatus;
a receiving unit for receiving an encrypted common key to the key request from the key management apparatus;

a common key decryption unit for decrypting a first encrypted common key included in the encrypted common key using a communication device unique key of the communication device and obtaining the common key; and
a common key distribution unit for transmitting other encrypted common key included in the encrypted common key to the plurality of first to N-th terminal devices with reference to the configuration information.

A key sharing method according to the present invention is a key sharing method for sharing key between a slave station having a communication device and a plurality of first to N-th terminal devices and a master station communicating with the slave station via a network, wherein
the communication device generates an information request and transmits it to the first terminal device,
the first terminal device generates a first information response to the information request and transmits it to the second terminal device,
further, the same process is sequentially performed by the respective terminal devices, and the N-th terminal device generates an N-th information response and transmits it to the communication device,
the communication device generates a key request from the N-th information response and transmits it to a key management apparatus,
the key request includes communication device identification information for identifying the communication device, a plurality of first to N-th pieces of terminal device identification information for respectively identifying the plurality of first to N-th terminal devices communicating with the communication device, a challenge generated by the communication device, and a response respectively generated by the plurality of first to N-th terminal devices using the respective terminal device unique key with respect to the challenge,
the key management apparatus generates a communication device unique key of the communication device using the communication device identification information included in the key request, generates the terminal device unique key of the plurality of first to N-th terminal devices using the plurality of first to N-th pieces of terminal device identification information included in the key request, verifies the challenge and the response using the generated terminal device unique key, and if the verification is successful, generates a common key shared by the communication device and the plurality of first to N-th terminal devices and encrypts the generated common key with the communication device unique key, and encrypts the common key with the terminal device unique key of the plurality of first to N-th terminal devices to generate encrypted common key, generates a key response including the encrypted common key, and transmits it to the communication device,
the communication device decrypts the encrypted common key encrypted with the communication device unique key included in the encrypted common key, with the communication device unique key of the communication device and obtains the common key,
transmits the encrypted common key to the plurality of first to N-th terminal devices, and
each of the plurality of first to N-th terminal devices decrypts the encrypted common key, which is obtained by encrypting the common key with the terminal device unique key of each of the plurality of first to N-th terminal devices, with the terminal device unique key of each of the plurality of first to N-th terminal devices and obtains the common key.

Advantage of the Invention

According to the present invention, when the communication device performs key sharing with all the terminal devices present in the vehicle, it is possible to reduce the number of communication packets exchanged between the communication device and the key management apparatus, thereby shortening the processing time required for the key sharing process.

MODE FOR CARRYING OUT THE INVENTION

Figure 1:
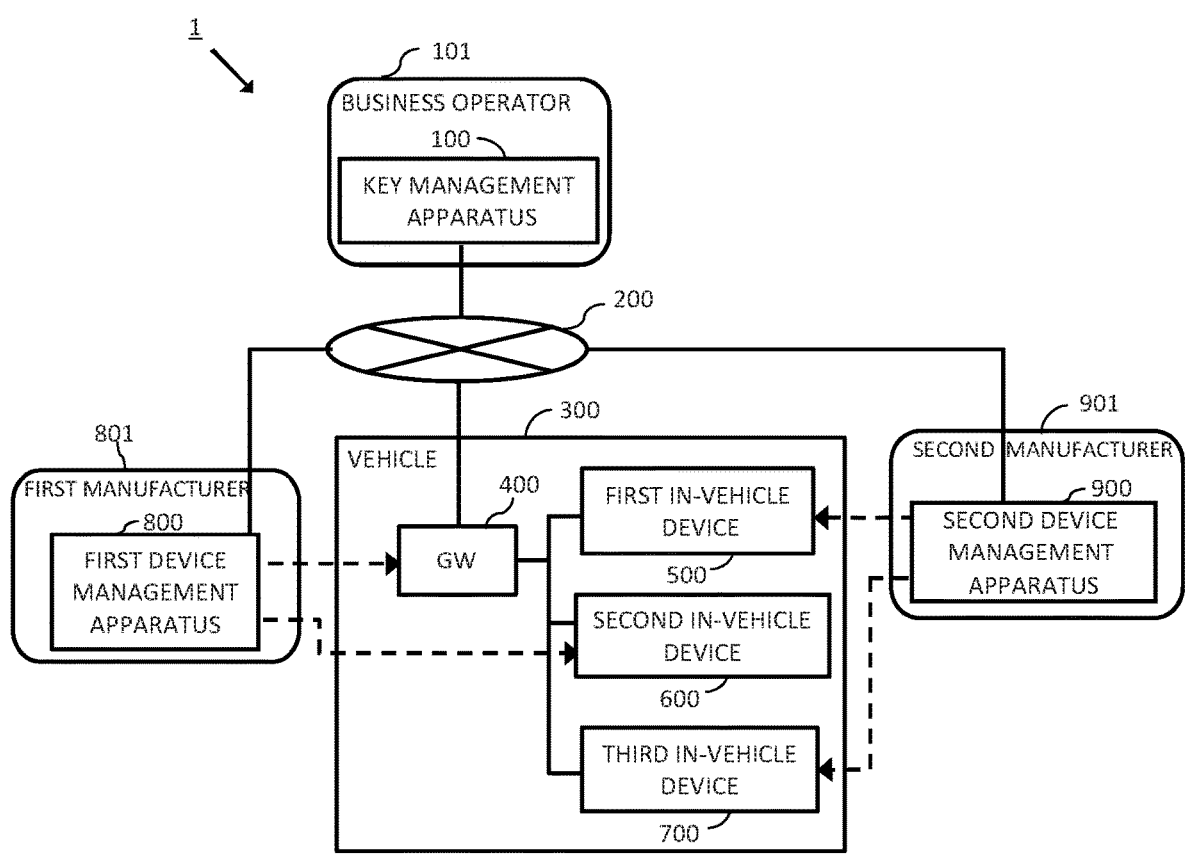
FIG. 1 is a schematic diagram showing an entire system of a key sharing system according to Embodiment 1 of the present invention.

Hereinafter, the best mode for carrying out the present invention will be described with reference to the drawings. In the drawings, the same reference numerals denote the same or corresponding parts, and a description thereof will be appropriately omitted or simplified.

Embodiment 1

FIG. 1 is a schematic diagram showing an entire configuration of a key sharing system according to Embodiment 1 of the present invention.

In the figure, a key sharing system 1 includes a business operator 101 provided with a key management apparatus 100, a vehicle 300 equipped with a plurality of in-vehicle devices to be authenticated, a first manufacturer 801 provided with a first device management apparatus 800, and a second manufacturer 901 provided with a second device management apparatus 900, and the key management apparatus 100, a GW 400, the first device management apparatus 800, and the second device management apparatus 900 are set to communicate with each other via a network 200.

Here, the business operator 101 has an equipment serving as a master station including the key management apparatus 100, and is also a manufacturer that manufactures the vehicle 300 serving as a slave station communicating with the master station. Although the figure shows the vehicle 300 provided with the GW 400, a first in-vehicle device 500, a second in-vehicle device 600, and a third in-vehicle device 700, the actual vehicle 300 is equipped with several tens to one hundred and several tens or N pieces of in-vehicle devices, and they are referred to as first to N-th terminal devices as necessary. The GW 400, the first in-vehicle device 500, the second in-vehicle device 600, and the third in-vehicle device 700, which are slave stations, are connected via cables and set as communication devices that communicate with each other.

The first manufacturer 801 is a manufacturer that manufactures devices mounted on the vehicle 300, and in this embodiment, it is assumed that the first manufacturer 801 manufactures the GW 400 and the second in-vehicle device 600. Further, the second manufacturer 901 is a manufacturer that manufactures the devices mounted on the vehicle 300, and in this embodiment, it is assumed that the second manufacturer 901 manufactures the first in-vehicle device 500 and the third in-vehicle device 700.

Figure 2:
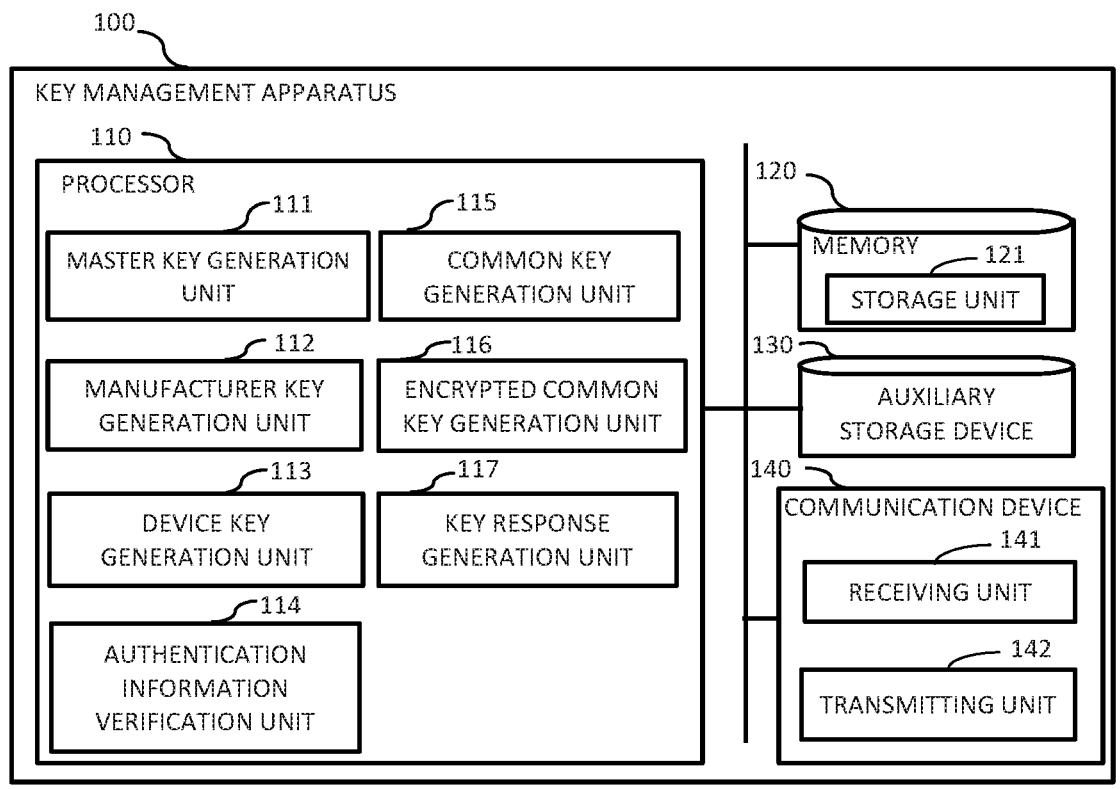
FIG. 2 is a block diagram showing a configuration of a key management apparatus 100 according to Embodiment 1 of the present invention.

FIG. 2 is a block diagram showing a configuration of the key management apparatus 100 according to Embodiment 1 of the present invention.

In the figure, the key management apparatus 100 is a computer including hardware such as a processor 110, a memory 120, an auxiliary storage device 130, and a communication device 140. These pieces of hardware are connected to one another via signal lines.

Further, the processor 110 is an integrated circuit that performs data processing, and controls other hardware. Specifically, the processor 110 is a central processing unit, a digital signal processor, or a graphics processing unit.

Further, the processor 110 includes "units" such as a master key generation unit 111, a manufacturer key generation unit 112, a device key generation unit 113, an authentication information verification unit 114, a common key generation unit 115, an encrypted common key generation unit 116, and a key response generation unit 117 as functional components. Functions of the "units" are realized by software.

The memory 120 is a volatile storage device (RAM; Random Access Memory), and is also called a main storage device or a main memory. The memory 120 functions as a storage unit 121 in which data used, generated, input, output, transmitted or received by the key management apparatus 100 is stored.

Further, the auxiliary storage device 130 is a non-volatile storage device, and specifically a read only memory (ROM), a hard disk drive (HDD), or a flash memory. The auxiliary storage device 130 stores a program for realizing the functions of the "units". The program for realizing the functions of the "units" is loaded into the memory 120 and executed by the processor 110.

Further, the auxiliary storage device 130 stores an operating system (hereinafter referred to as OS) in the auxiliary storage device 130, and at least a part of the OS is loaded into the memory 120 and executed by the processor 110.

That is, the processor 110 executes the program for realizing the functions of the "units" while executing the OS. The data obtained by executing the program for realizing the functions of the "units" is stored in the storage device such as the memory 120, the auxiliary storage device 130, a register in the processor 110 or a cache memory in the processor 110.

Note that hardware in which the processor 110, the memory 120, and the auxiliary storage device 130 are put together is referred to as "processing circuitry".

Next, the communication device 140 includes a receiver and a transmitter, and specifically, is constituted by a communication chip or a network interface card (NIC) for connection to a communication network.

The communication device 140 functions as a communication unit that communicates the data. That is, the receiver of the communication device 140 functions as a receiving unit 141 that receives the data, and the transmitter functions as a transmitting unit 142 that transmits the data.

Note that the key management apparatus 100 may include a plurality of processors that replace the processor 110, and the plurality of processors can share execution of the program for realizing the functions of the "units". Further, the program for realizing the functions of the "units" can be readably stored in a non-volatile storage medium which is a non-temporary tangible medium such as a magnetic disk, an optical disk, or a flash memory. Furthermore, the "units" such as the receiving unit 141 and the transmitting unit 142 may be read as "processing" or "processes", and the functions of the "units" may be realized by firmware.

Figure 3:
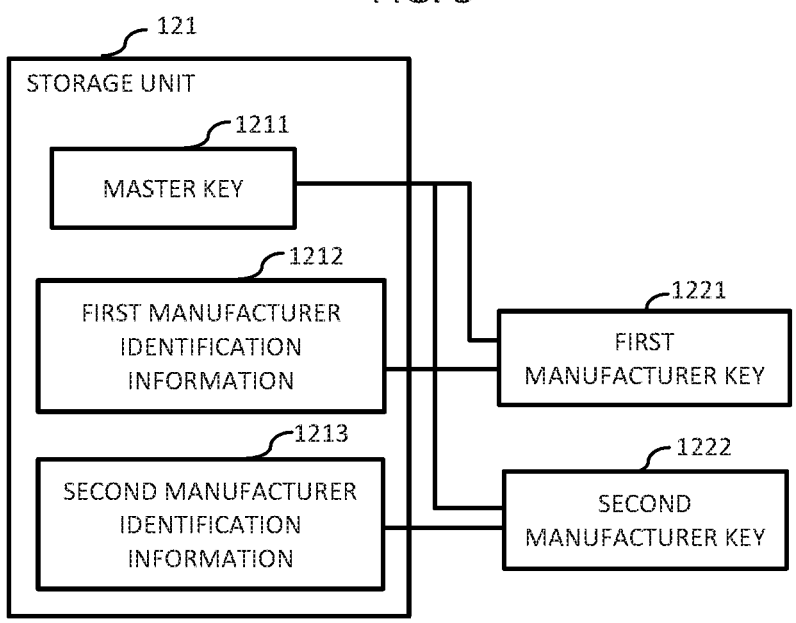
FIG. 3 is a diagram showing a data structure stored in a storage unit 121 of the key management apparatus 100 according to Embodiment 1 of the present invention.

FIG. 3 is a diagram showing a data structure stored in the storage unit 121. The storage unit 121 stores a master key 1211, first manufacturer identification information 1212, and second manufacturer identification information 1213, and these data is safely managed so as not to leak to the outside.

Contents of the data stored in the storage unit 121 will be described below. Further, the data stored in the storage unit 121 is not limited to the data shown in FIG. 3.

Further, the master key 1211, the first manufacturer identification information 1212 and the second manufacturer identification information 1213 are stored in the auxiliary storage device 130 at the time of key generation described below, and then read from the auxiliary storage device 130 and written to the storage unit 121 when the key management apparatus 100 is activated.

Figure 4:
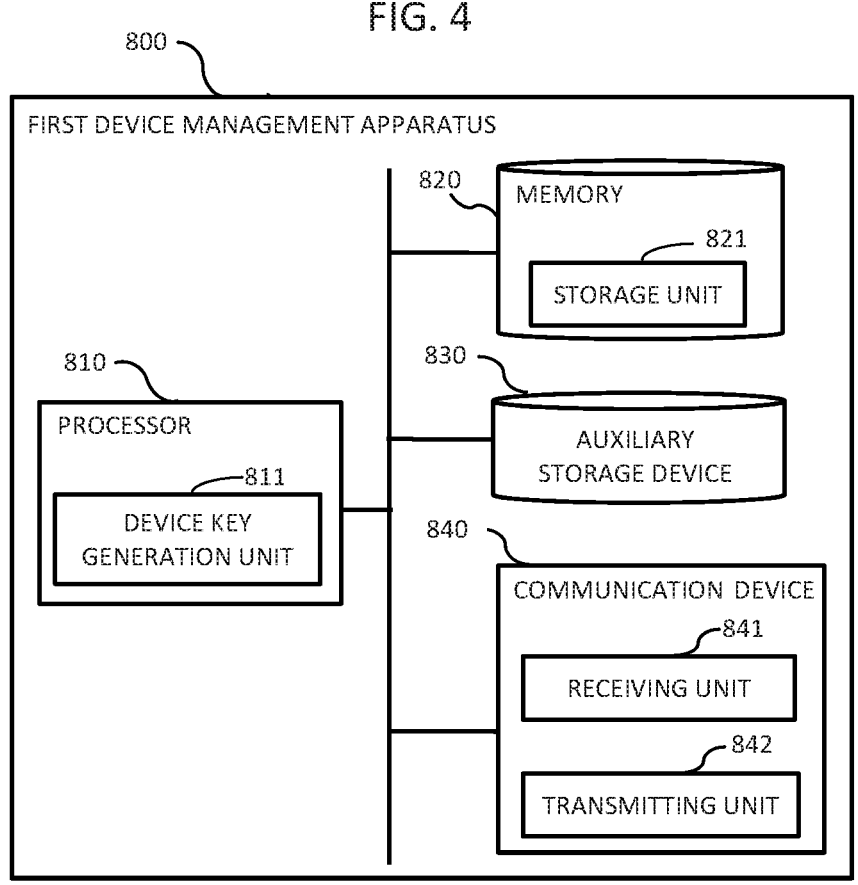
FIG. 4 is a block diagram showing a configuration of a first device management apparatus 800 according to Embodiment 1 of the present invention.

FIG. 4 is a block diagram showing a configuration of the first device management apparatus 800.

In the figure, the first device management apparatus 800 is the computer including hardware such as a processor 810, a memory 820, an auxiliary storage device 830, and a communication device 840, and these pieces of hardware are connected to one another via the signal lines.

Further, the processor 810, the memory 820, the auxiliary storage device 830, and the communication device 840 are hardware corresponding to the processor 110, the memory 120, the auxiliary storage device 130, and the communication device 140 described in FIG. 2.

Furthermore, the first device management apparatus 800 includes the "units" such as a device key generation unit 811 as the functional components. The functions of the "units" are realized by the software described below.

In the description of FIG. 4, the "units" mean the functional components included in the first device management apparatus 800.

The auxiliary storage device 830 stores the program for realizing the functions of the "units", and the program for realizing the functions of the "units" is loaded into the memory 820 and executed by the processor 810. Further, the OS is stored in the auxiliary storage device 830, and at least a part of the OS is loaded into the memory 820 and executed by the processor 810.

That is, the processor 810 executes the program for realizing the functions of the "units" while executing the OS.

The data obtained by executing the program for realizing the functions of the "units" is stored in the storage device such as the memory 820, the auxiliary storage device 830, the register in the processor 810 or the cache memory in the processor 810. Here, the memory 820 functions as a storage unit 821 in which the data used, generated, input, output, transmitted or received by the first device management apparatus 800 is stored. However, another storage device may function as the storage unit 821.

Further, the communication device 840 functions as a communication unit that communicates the data, and includes a receiving unit (receiver) 841 for receiving the data, and a transmitting unit (transmitter) 842 for transmitting the data.

Note that the first device management apparatus 800 may include the plurality of processors that replace the processor 810, and the plurality of processors may share execution of the program for realizing the functions of the "units". Further, the program for realizing the functions of the "units" can be readably stored in the non-volatile storage medium. Furthermore, the "units" may be read as "processing" or "processes", and the functions of the "units" may be realized by the firmware.

Figure 5:
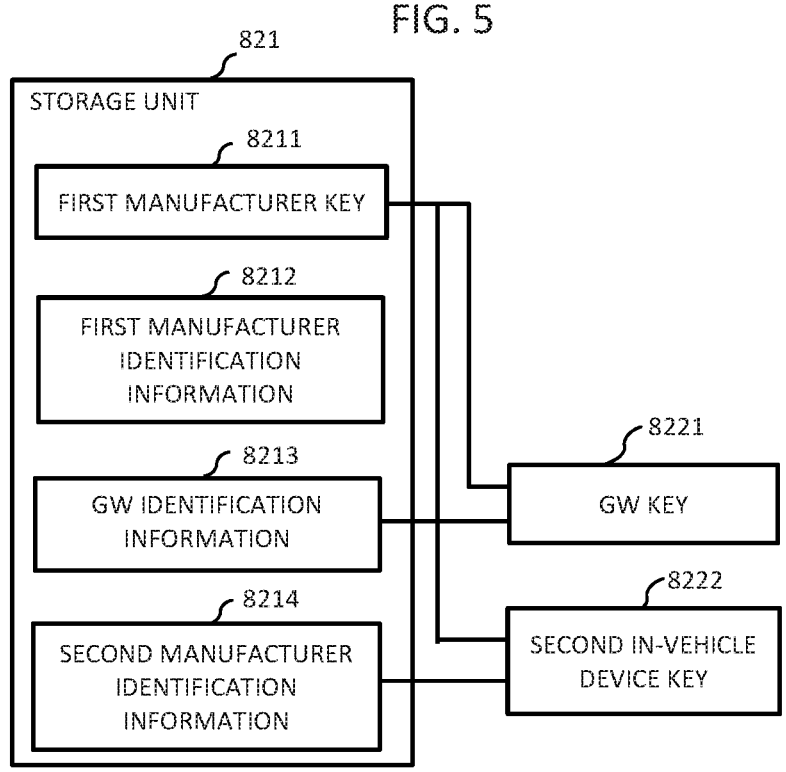
FIG. 5 is a diagram showing the data structure stored in a storage unit 821 of the first device management apparatus 800 according to Embodiment 1 of the present invention.

FIG. 5 is a diagram showing the data structure stored in the storage unit 821 of the first device management apparatus 800. The storage unit 821 stores a first manufacturer key 8211, first manufacturer identification information 8212, GW identification information 8213 and second in-vehicle device identification information 8214, and these data is safely managed so as not to leak to the outside.

Further, the first manufacturer key 8211, the first manufacturer identification information 8212, the GW identification information 8213, and the second in-vehicle device identification information 8214 are stored in the auxiliary storage device 830 at the time of reception or generation described below, and read from the auxiliary storage device 830 and written to the storage unit 821 when the first device management apparatus 800 is activated.

Note that the contents of the data stored in the storage unit 821 will be described below. Furthermore, the data stored in the storage unit 821 is not limited to the data structure shown in FIG. 5.

Figure 6:
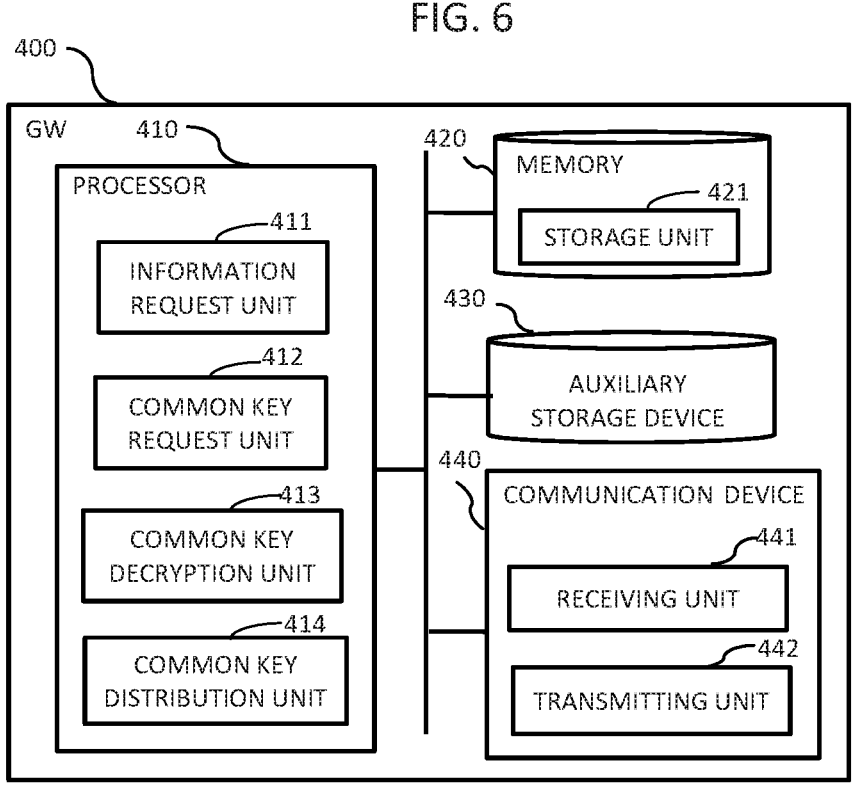
FIG. 6 is a block diagram showing a configuration of a GW 400 according to Embodiment 1 of the present invention.

FIG. 6 is a block diagram showing a configuration of the GW 400 according to Embodiment 1.

In the figure, the GW 400 is the computer including hardware such as a processor 410, a memory 420, an auxiliary storage device 430, and a communication device 440, and these pieces of hardware are connected to one another via the signal lines.

Further, the processor 410, the memory 420, the auxiliary storage device 430, and the communication device 440 are hardware corresponding to the processor 110, the memory 120, the auxiliary storage device 130, and the communication device 140 described in FIG. 2.

The GW 400 includes the "units" such as an information request unit 411, a common key request unit 412, a common key decryption unit 413, and a common key distribution unit 414 as the functional components, and the functions of the "units" are realized by the software described below.

Further, in the description of FIG. 6, the "units" mean the functional components included in the GW 400, and the auxiliary storage device 430 stores the program for realizing the functions of the "units". The program for realizing the functions of the "units" is loaded into the memory 420 and executed by the processor 410.

Further, the OS is stored in the auxiliary storage device 430, and at least a part of the OS is loaded into the memory 420 and executed by the processor 410.

That is, the processor 410 executes the program for realizing the functions of the "units" while executing the OS.

Here, the data obtained by executing the program for realizing the functions of the "units" is stored in the storage device such as the memory 420, the auxiliary storage device 430, the register in the processor 410 or the cache memory in the processor 410. Further, the memory 420 functions as the storage unit 421 in which the data used, generated, input, output, transmitted, or received by the GW 400 is stored. However, another storage device may be configured to function as the storage unit 421.

Further, the communication device 440 functions as the communication unit that communicates the data, and includes a receiving unit (receiver) 441 for receiving the data, and a transmitting unit (transmitter) 442 for transmitting the data.

Note that the GW 400 may include the plurality of processors that replace the processor 410, and the plurality of processors may share execution of the program for realizing the functions of the "units". Further, the program for realizing the functions of the "units" can be readably stored in the non-volatile storage medium. Furthermore, the "units" may be read as "processing" or "processes", and the functions of the "units" may be realized by the firmware.

Figure 7:
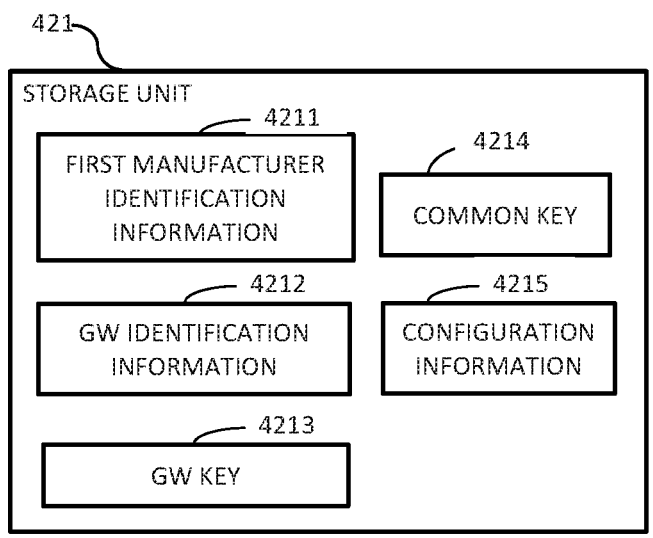
FIG. 7 is a diagram showing the data structure stored in a storage unit 421 of the GW 400 according to Embodiment 1 of the present invention.

FIG. 7 is a diagram showing the data structure stored in the storage unit 421 of the GW 400 according to Embodiment 1. The storage unit 421 stores first manufacturer identification information 4211, GW identification information 4212, a GW key 4213, a common key 4214 and configuration information 4215, and these data is safely managed so as not to leak to the outside.

Note that the contents of the data stored in the storage unit 421 will be described below. Further, the data stored in the storage unit 421 is not limited to the data structure shown in FIG. 7.

Furthermore, the first manufacturer identification information 4211, the GW identification information 4212, the GW key 4213, and the common key 4214 are stored in the auxiliary storage device 430 at the time of reception or decryption described below, and read from the auxiliary storage device 430 and written to the storage unit 421 when the GW 400 is activated.

Figure 8:
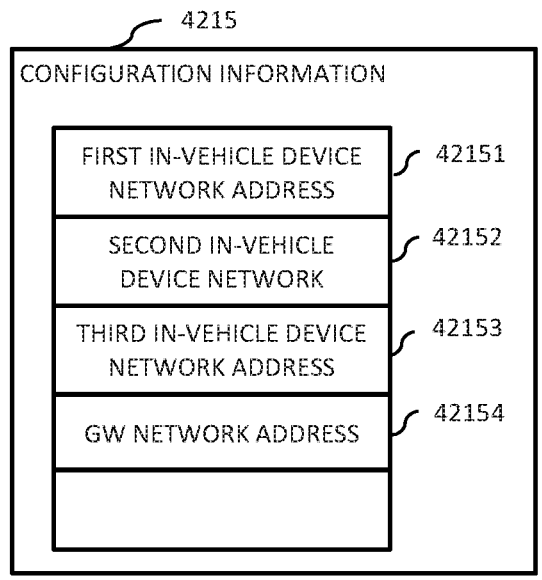
FIG. 8 is a diagram showing an example of configuration information 4215 according to Embodiment 1 of the present invention.

Here, the configuration information 4215 is a list of network address information of the in-vehicle devices connected to the GW 400 via the cables in the vehicle 300, and for example, as shown in FIG. 8, a first in-vehicle device network address 42151, a second in-vehicle device network address 42152, a third in-vehicle device network address 42153 and a GW network address 42154 are set therein.

The first in-vehicle device network address 42151 is a network address value of the first in-vehicle device 500, the second in-vehicle device network address 42152 is the network address value of the second in-vehicle device 600, the third in-vehicle device network address 42153 is the network address value of the third in-vehicle device 700, and the GW network address 42154 is the network address value of the GW 400 set at the end of the configuration information 4215.

The above-described network address is an address for uniquely identifying each other when the devices communicate with each other in the vehicle 300, and specifically, a CAN ID in a CAN (Controller Area Network) protocol. Or, it may be a value according to a communication protocol used in the vehicle 300, for example, an IP (Internet Protocol) address or the like.

Further, the configuration information 4215 is created and written to the storage unit 421 of the GW 400, for example, by the business operator 101 before a key sharing process described below is performed. Or, before the key sharing process described below is performed, the GW 400 may inquire of the first in-vehicle device 500, the second in-vehicle device 600, and the third in-vehicle device 700, to automatically create a list of the inquiries and write it in the storage unit 421.

Figure 9:
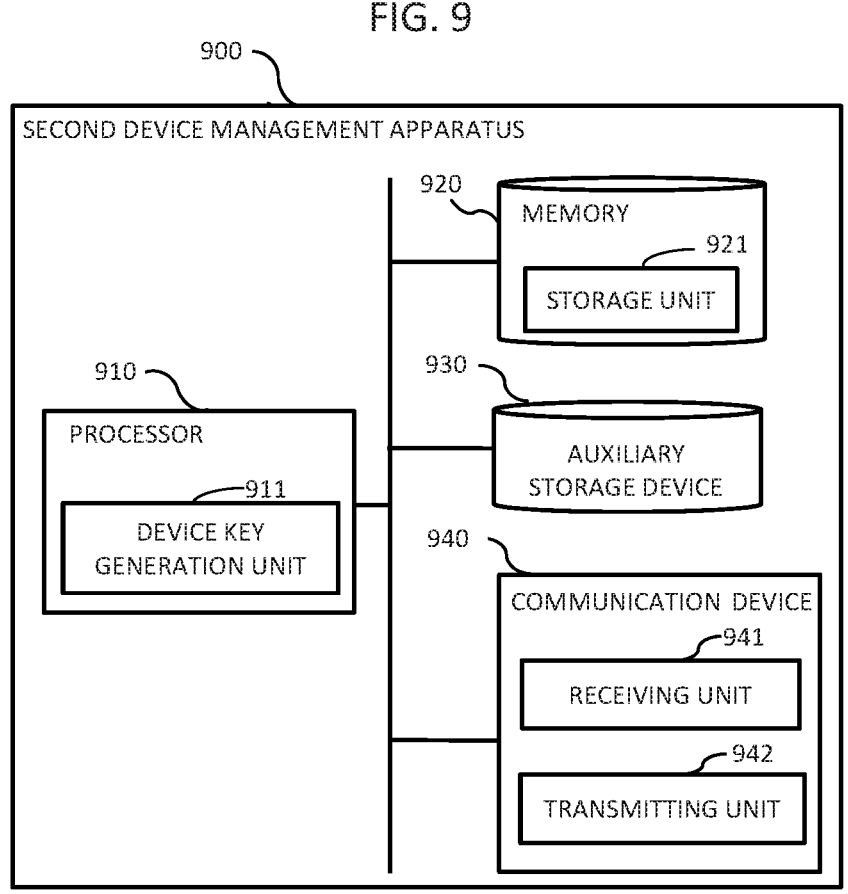
FIG. 9 is a block diagram of a second device management apparatus 900 according to Embodiment 1 of the present invention.

FIG. 9 is a block diagram of the second device management apparatus 900 according to Embodiment 1.

In the figure, the second device management apparatus 900 is the computer including hardware such as a processor 910, a memory 920, an auxiliary storage device 930, and a communication device 940, and these pieces of hardware are connected to one another via the signal lines. Further, the processor 910, the memory 920, the auxiliary storage device 930, and the communication device 940 are hardware corresponding to the processor 110, the memory 120, the auxiliary storage device 130, and the communication device 140 described in FIG. 2.

The second device management apparatus 900 includes the "units" such as a device key generation unit 911 as the functional components, and the functions of the "units" are realized by the software described below. Further, in the description of FIG. 9, the "units" mean the functional components included in the second device management apparatus 900, and the auxiliary storage device 930 stores the program for realizing the functions of the "units". The program for realizing the functions of the "units" is loaded into the memory 920 and executed by the processor 910.

Further, the OS is stored in the auxiliary storage device 930, and at least a part of the OS is loaded into the memory 920 and executed by the processor 910.

That is, the processor 910 executes the program for realizing the functions of the "units" while executing the OS.

Here, the data obtained by executing the program for realizing the functions of the "units" is stored in the storage device such as the memory 920, the auxiliary storage device 930, the register in the processor 910 or the cache memory in the processor 910. Further, the memory 920 functions as the storage unit 921 in which the data used, generated, input, output, transmitted, or received by the second device management apparatus 900 is stored. However, another storage device may be configured to function as the storage unit 921.

Further, the communication device 940 functions as the communication unit that communicates the data, and includes a receiving unit (receiver) 941 for receiving the data, and a transmitting unit (transmitter) 942 for transmitting the data.

Note that the second device management apparatus 900 may include the plurality of processors that replace the processor 910, and the plurality of processors may share execution of the program for realizing the functions of the "units". Further, the program for realizing the functions of the "units" can be readably stored in the non-volatile storage medium. Furthermore, the "units" may be read as "processing" or "processes", and the functions of the "units" may be realized by the firmware.

Figure 10:
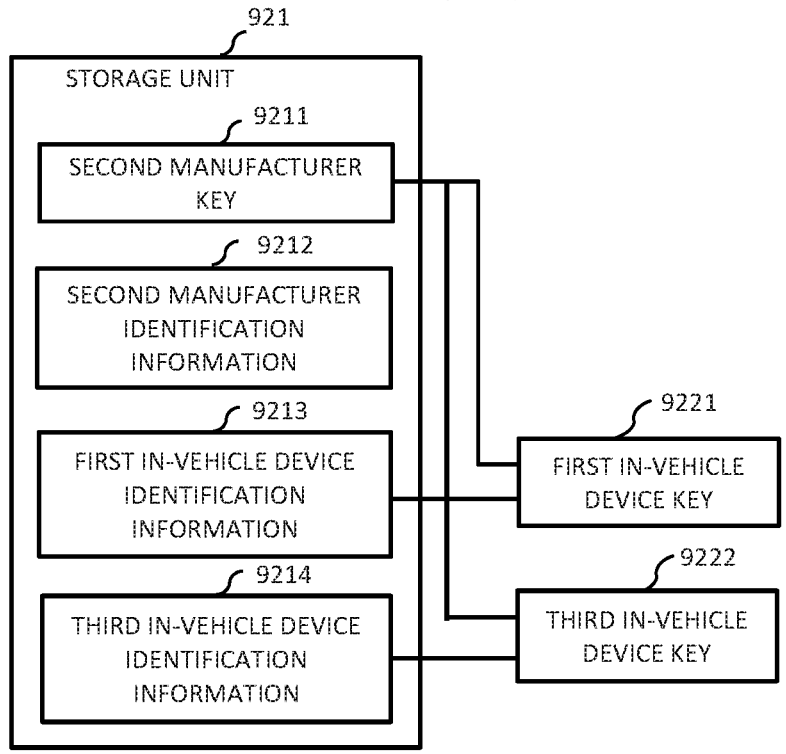
FIG. 10 is a diagram showing the data structure stored in a storage unit 921 of the second device management apparatus 900 according to Embodiment 1 of the present invention.

FIG. 10 is a diagram showing the data structure stored in the storage unit 921 of the second device management apparatus 900 according to Embodiment 1. The storage unit 921 stores a second manufacturer key 9211, second manufacturer identification information 9212, first in-vehicle device identification information 9213, and third in-vehicle device identification information 9214, and these data is safely managed so as not to leak to the outside.

Note that the contents of the data stored in the storage unit 921 will be described below. Further, the data stored in the storage unit 921 is not limited to the data structure shown in FIG. 10.

The second manufacturer key 9211, the second manufacturer identification information 9212, the first in-vehicle device identification information 9213, and the third in-vehicle device identification information 9214 are stored in the auxiliary storage device 930 at the time of reception or generation described below, and then read from the auxiliary storage device 930 and written to the storage unit 921 when the second device management apparatus 900 is activated.

Figure 11:
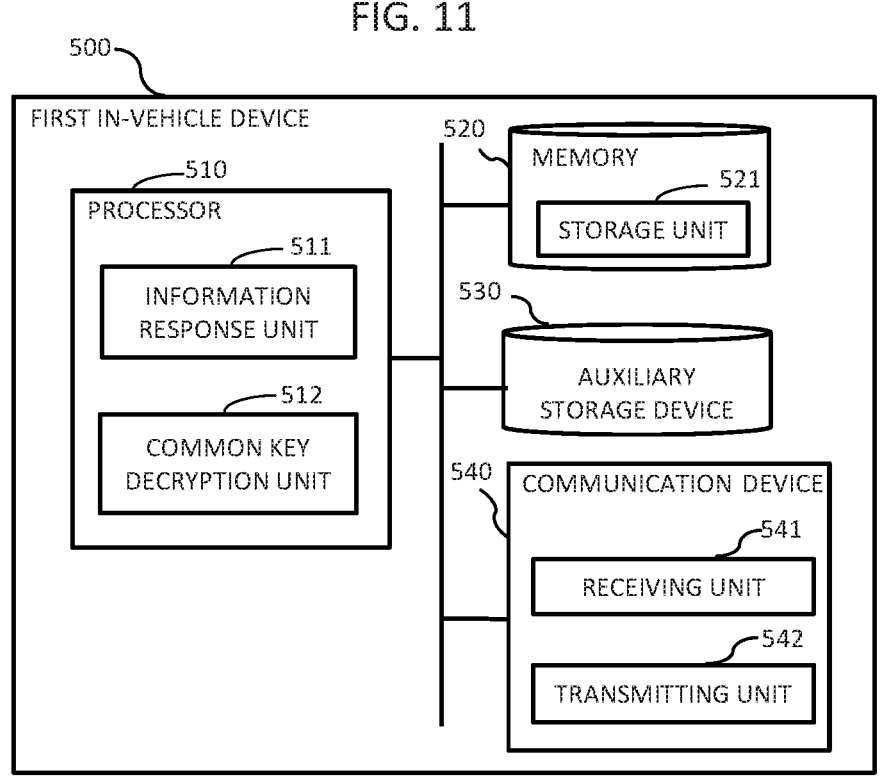
FIG. 11 is a block diagram showing a configuration of a first in-vehicle device 500 according to Embodiment 1 of the present invention.

FIG. 11 is a block diagram showing a configuration of the first in-vehicle device 500 according to Embodiment 1.

In the figure, the first in-vehicle device 500 is the computer including hardware such as a processor 510, a memory 520, an auxiliary storage device 530, and a communication device 540, these pieces of hardware are connected to one another via the signal lines. Further, the processor 510, the memory 520, the auxiliary storage device 530, and the communication device 540 are hardware corresponding to the processor 110, the memory 120, the auxiliary storage device 130, and the communication device 140 described in FIG. 2.

The first in-vehicle device 500 includes the "units" such as an information response unit 511 and a common key decryption unit 512 as the functional components, and the functions of the "units" are realized by the software described below. Further, in the description of FIG. 11, the "units" mean the functional components included in the first in-vehicle device 500, and the auxiliary storage device 530 stores the program for realizing the functions of the "units". The program for realizing the functions of the "units" is loaded into the memory 520 and executed by the processor 510.

Further, the OS is stored in the auxiliary storage device 530, and at least a part of the OS is loaded into the memory 520 and executed by the processor 510.

That is, the processor 510 executes the program for realizing the functions of the "units" while executing the OS.

Here, the data obtained by executing the program for realizing the functions of the "units" is stored in the storage device such as the memory 520, the auxiliary storage device 530, the register in the processor 510 or the cache memory in the processor 510. Further, the memory 520 functions as the storage unit 521 in which the data used, generated, input, output, transmitted, or received by the first in-vehicle device 500 is stored. However, another storage device may be configured to function as the storage unit 521.

Further, the communication device 540 functions as the communication unit that communicates the data, and includes a receiving unit (receiver) 541 for receiving the data, and a transmitting unit (transmitter) 542 for transmitting the data.

Note that the first in-vehicle device 500 may include the plurality of processors that replace the processor 510, and the plurality of processors may share execution of the program for realizing the functions of the "units". Further, the program for realizing the functions of the "units" can be computer-readably stored in the non-volatile storage medium. Furthermore, the "units" may be read as "processing" or "processes", and the functions of the "units" may be realized by the firmware.

Figure 12:
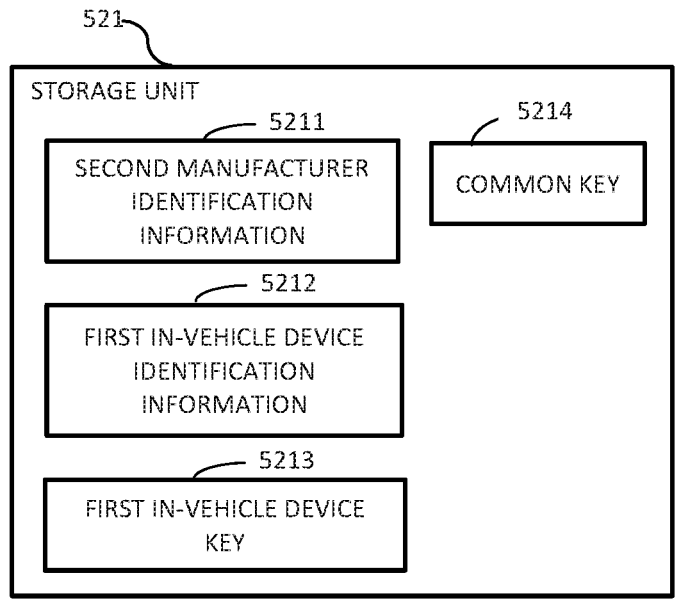
FIG. 12 is a diagram showing the data structure stored in a storage unit 521 of the first in-vehicle device 500 according to Embodiment 1 of the present invention.

FIG. 12 is a diagram showing the data structure stored in the storage unit 521 of the first in-vehicle device 500 according to Embodiment 1. The storage unit 521 stores second manufacturer identification information 5211, first in-vehicle device identification information 5212, a first in-vehicle device key 5213, and a common key 5214, and these data is safely managed so as not to leak to the outside.

The contents of the data stored in the storage unit 521 will be described below. Further, the data stored in the storage unit 521 is not limited to the data shown in FIG. 12.

The second manufacturer identification information 5211, the first in-vehicle device identification information 5212, the first in-vehicle device key 5213, and the common key 5214 are stored in the auxiliary storage device 530 at the time of reception or decryption described below, and then read from the auxiliary storage device 530 and written to the storage unit 521 when the first in-vehicle device 500 is activated.

Figure 13:
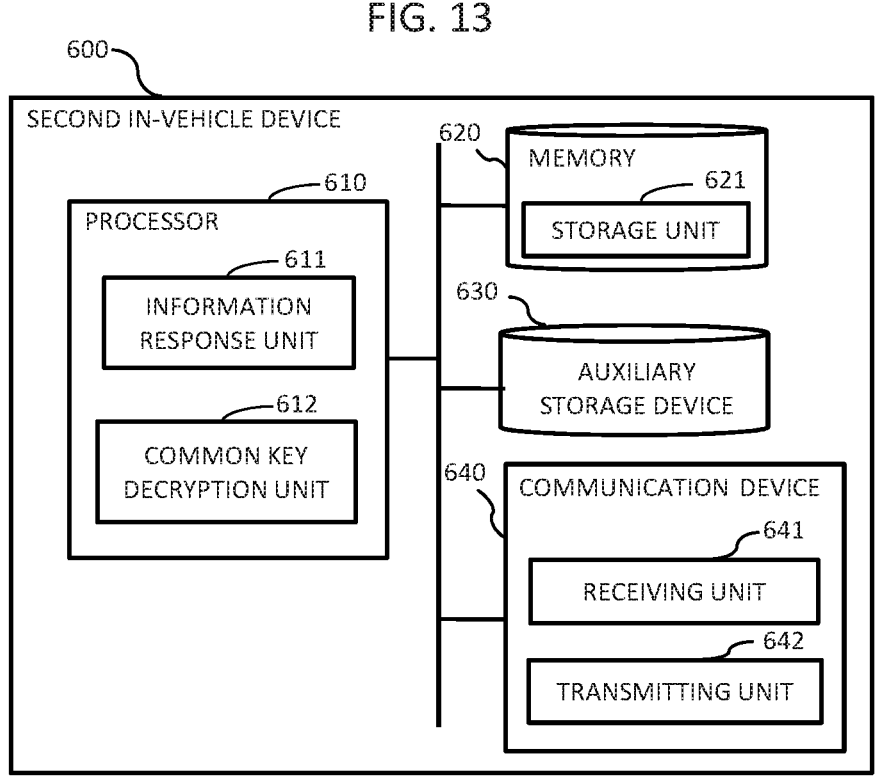
FIG. 13 is a block diagram showing a configuration of a second in-vehicle device 600 according to Embodiment 1 of the present invention.

FIG. 13 is a block diagram showing a configuration of the second in-vehicle device 600 according to Embodiment 1.

In the figure, the second in-vehicle device 600 is the computer including hardware such as a processor 610, a memory 620, an auxiliary storage device 630, and a communication device 640, these pieces of hardware are connected to one another via the signal lines.

Further, the processor 610, the memory 620, the auxiliary storage device 630, and the communication device 640 are hardware corresponding to the processor 110, the memory 120, the auxiliary storage device 130, and the communication device 140 described in FIG. 2.

The second in-vehicle device 600 includes the "units" such as an information response unit 611 and a common key decryption unit 612 as the functional components, and the functions of the "units" are realized by the software described below. Further, in the description of FIG. 13, the "units" mean the functional components included in the second in-vehicle device 600, and the auxiliary storage device 630 stores the program for realizing the functions of the "units". The program for realizing the functions of the "units" is loaded into the memory 620 and executed by the processor 610.

Further, the OS is stored in the auxiliary storage device 630, and at least a part of the OS is loaded into the memory 620 and executed by the processor 610.

That is, the processor 610 executes the program for realizing the functions of the "units" while executing the OS.

Here, the data obtained by executing the program for realizing the functions of the "units" is stored in the storage device such as the memory 620, the auxiliary storage device 630, the register in the processor 610 or the cache memory in the processor 610.

Further, the memory 620 may be configured to function as the storage unit 621 in which the data used, generated, input, output, transmitted, or received by the second in-vehicle device 600 is stored. However, another storage device may be configured to function as the storage unit 621.

Further, the communication device 640 functions as the communication unit that communicates the data, and includes a receiving unit (receiver) 641 for receiving the data, and a transmitting unit (transmitter) 642 for transmitting the data.

Note that the second in-vehicle device 600 may include the plurality of processors that replace the processor 610, and the plurality of processors may share execution of the program for realizing the functions of the "units". Further, the program for realizing the functions of the "units" can be computer-readably stored in the non-volatile storage medium. Furthermore, the "units" may be read as "processing" or "processes", and the functions of the "units" may be realized by the firmware.

Figure 14:
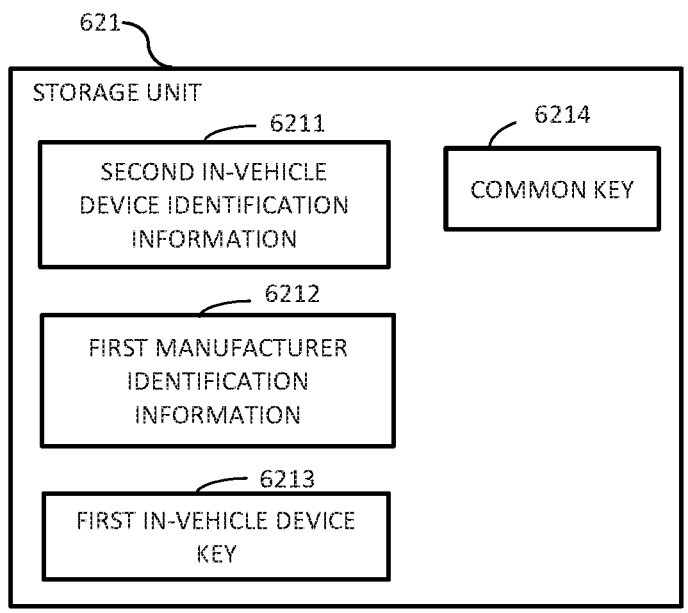
FIG. 14 is a diagram showing the data structure stored in a storage unit 621 of the second in-vehicle device 600 according to Embodiment 1 of the present invention.

FIG. 14 is a diagram showing the data structure stored in the storage unit 621 of the second in-vehicle device 600 according to Embodiment 1. The storage unit 621 stores a first manufacturer identification information 6211, second in-vehicle device identification information 6212, a second in-vehicle device key 6213, and a common key 6214, and these data is safely managed so as not to leak to the outside.

The contents of the data stored in the storage unit 621 will be described below. Further, the data stored in the storage unit 621 is not limited to the data structure shown in FIG. 14.

The first manufacturer identification information 6211, the second in-vehicle device identification information 6212, the second in-vehicle device key 6213, and the common key 6214 are stored in the auxiliary storage device 630 at the time of reception or decryption described below, and then read from the auxiliary storage device 630 and written to the storage unit 621 when the second in-vehicle device 600 is activated.

Here, since the second in-vehicle device 600 is assumed to be manufactured by the same first manufacturer 801 as the GW 400, the value of the first manufacturer identification information 6211 stored in the storage unit 621 is the same as the value of the first manufacturer identification information 4211 stored in the storage unit 421 of the GW 400.

Figure 15:
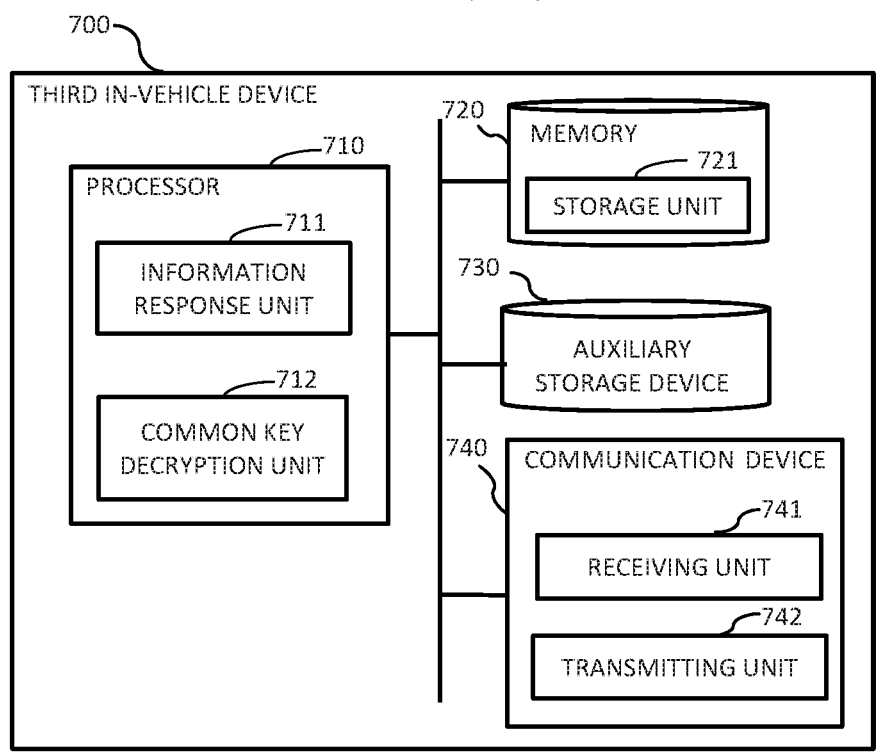
FIG. 15 is a block diagram showing a configuration of a third in-vehicle device 700 according to Embodiment 1 of the present invention.

FIG. 15 is a block diagram showing a configuration of the third in-vehicle device 700 according to Embodiment 1.

In the figure, the third in-vehicle device 700 is the computer including hardware such as a processor 710, a memory 720, an auxiliary storage device 730, and a communication device 740, these pieces of hardware are connected to one another via the signal lines. Further, the processor 710, the memory 720, the auxiliary storage device 730, and the communication device 740 are hardware corresponding to the processor 110, the memory 120, the auxiliary storage device 130, and the communication device 140 described in FIG. 2.

The third in-vehicle device 700 includes the "units" such as an information response unit 711 and a common key decryption unit 712 as the functional components, and the functions of the "units" are realized by the software described below. Further, in the description of FIG. 15, the "units" mean the functional components included in the third in-vehicle device 700, and the auxiliary storage device 730 stores the program for realizing the functions of the "units". The program for realizing the functions of the "units" is loaded into the memory 720 and executed by the processor 710.

Further, the OS is stored in the auxiliary storage device 730, and at least a part of the OS is loaded into the memory 720 and executed by the processor 710.

That is, the processor 710 executes the program for realizing the functions of the "units" while executing the OS.

Here, the data obtained by executing the program for realizing the functions of the "units" is stored in the storage device such as the memory 720, the auxiliary storage device 730, the register in the processor 710 or the cache memory in the processor 710.

Further, the memory 720 functions as the storage unit 721 in which the data used, generated, input, output, transmitted, or received by the third in-vehicle device 700 is stored. However, another storage device may be configured to function as the storage unit 721.

Further, the communication device 740 functions as the communication unit that communicates the data, and includes a receiving unit (receiver) 741 for receiving the data, and a transmitting unit (transmitter) 742 for transmitting the data.

Note that the third in-vehicle device 700 may include the plurality of processors that replace the processor 710, and the plurality of processors may share execution of the program for realizing the functions of the "units". Further, the program for realizing the functions of the "units" can be computer-readably stored in the non-volatile storage medium. Furthermore, the "units" may be read as "processing" or "processes", and the functions of the "units" may be realized by the firmware.

Figure 16:
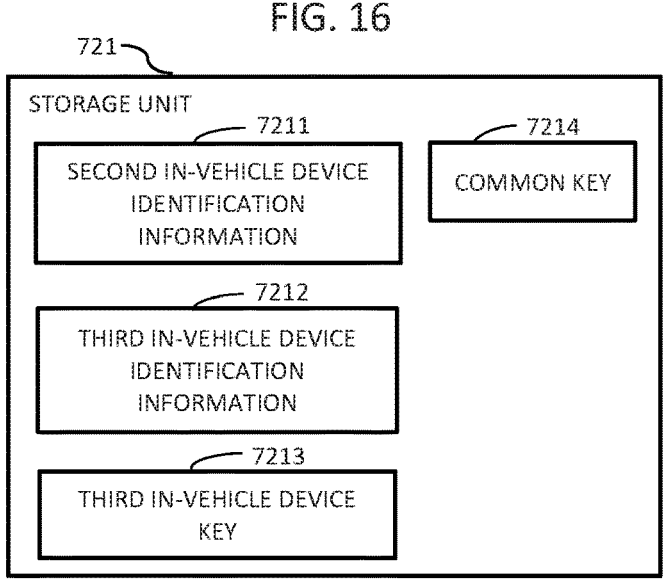
FIG. 16 is a diagram showing the data structure stored in a storage unit 721 of the third in-vehicle device 700 according to Embodiment 1 of the present invention.

FIG. 16 is a diagram showing the data structure stored in the storage unit 721 of the third in-vehicle device 700 according to Embodiment 1. The storage unit 721 stores a second manufacturer identification information 7211, third in-vehicle device identification information 7212, a third in-vehicle device key 7213, and a common key 7214, and these data is safely managed so as not to leak to the outside.

The contents of the data stored in the storage unit 721 will be described below. Further, the data stored in the storage unit 721 is not limited to the data shown in FIG. 16.

The second manufacturer identification information 7211, the third in-vehicle device identification information 7212, the third in-vehicle device key 7213, and the common key 7214 are stored in the auxiliary storage device 730 at the time of reception or decryption described below, and then read from the auxiliary storage device 730 and written to the storage unit 721 when the third in-vehicle device 700 is activated.

Here, since the third in-vehicle device 700 is assumed to be manufactured by the same second manufacturer 901 as the first in-vehicle device 500, the value of the second manufacturer identification information 7211 stored in the storage unit 721 is the same as the value of the second manufacturer identification information 5211 stored in the storage unit 521 of the first in-vehicle device 500.

Next, an operation of the key sharing system as described above will be described with reference to FIGS. 17 to 29.

The operation of the key sharing system according to this embodiment corresponds to a key sharing method, and a procedure of the key sharing method corresponds to the procedure of a key sharing program. Further, the procedure of the key management apparatus 100 corresponds to the procedure of a key management program, and the procedure of the operation of the first device management apparatus 800 and the second device management apparatus 900 corresponds to the procedure of a device management program. Furthermore, the procedure of the operation of the GW 400, the first in-vehicle device 500, the second in-vehicle device 600, and the third in-vehicle device 700 corresponds to the procedure of a device program.

Figure 17:
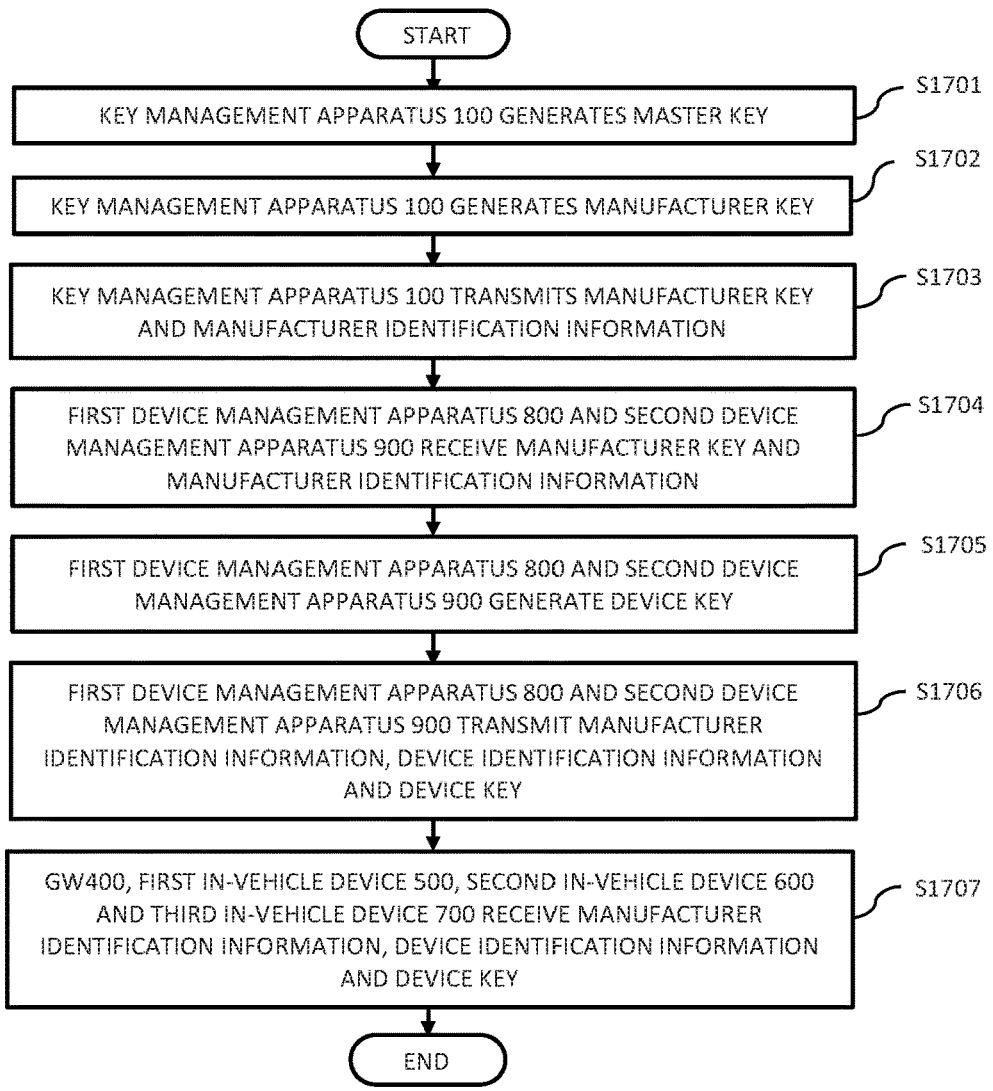
FIG. 17 is a flowchart of a device key setting process according to Embodiment 1 of the present invention.

FIG. 17 shows a flowchart of a device key setting process according to Embodiment 1, and is the flowchart for setting a device key unique to each of the GW 400, the first in-vehicle device 500, the second in-vehicle device 600 and the third in-vehicle device 700.

First, in Step S1701 shown in FIG. 17, when the key management apparatus 100 receives a key request from the vehicle 300, the master key generation unit 111 generates the master key 1211. The master key 1211 is a key used to generate a first manufacturer key 1221 and a second manufacturer key 1222.

Specifically, the master key generation unit 111 generates a random number, and uses the generated random number as an input to perform a key generation function. The key generation function is a function for generating the key, and the generated key is the master key 1211.

Next, in Step S1702, the manufacturer key generation unit 112 uses the master key 1211 and the first manufacturer identification information 1212 which is information for identifying the first manufacturer 801 to generate the first manufacturer key 1221 (see FIG. 3) which is an individual key for the first manufacturer 801.

Specifically, first, the manufacturer key generation unit 112 randomly generates a character string, and generates the first manufacturer identification information 1212. The manufacturer key generation unit 112 may select any manufacturer identification information as the first manufacturer identification information 1212 from a list including multiple pieces of manufacturer identification information. Further, the manufacturer key generation unit 112 may generate the first manufacturer identification information 1212 by another method.

As an algorithm for generating the common key, there is HMAC (Hash-based MAC (Message Authentication Code)) which is one of image authentication codes. Further, in conjunction with generation of the first manufacturer key 1221, the manufacturer key generation unit 112 uses the master key 1211 and the second manufacturer identification information 1213 which is information for identifying the second manufacturer 901, to generate the second manufacturer key 1222 which is the individual key for the second manufacturer 901. A method for generating the second manufacturer identification information 1213 and the second manufacturer key 1222 is the same as the method for generating the first manufacturer identification information 1212 and the first manufacturer key 1221 described above.

Next, in Step S1703, the transmitting unit 142 transmits the first manufacturer key 1221 and the first manufacturer identification information 1212 to the first device management apparatus 800, and transmits the second manufacturer key 1222 and the second manufacturer identification information 1213 to the second device management apparatus 900.

Here, the first manufacturer key 1221, the first manufacturer identification information 1212, the second manufacturer key 1222, and the second manufacturer identification information 1213 are assumed to be safely transmitted. Specifically, they are transmitted using TLS (Transport Layer Security) which is one of methods for encrypting, transmitting and receiving data. Further, it may also be safely distributed offline.

Next, in Step S1704, the receiving unit 841 of the first device management apparatus 800 receives the first manufacturer key 1221 and the first manufacturer identification information 1212, and stores the pieces of information in the storage unit 821 as shown in FIG. 5. Here, the first manufacturer key 1221 and the first manufacturer identification information 1212 stored in the storage unit 821 are referred to as the first manufacturer key 8211 and the first manufacturer identification information 8212.

Further, the receiving unit 941 of the second device management apparatus 900 receives the second manufacturer key 1222 and the second manufacturer identification information 1213, and stores the information in the storage unit 921. Here, the second manufacturer key 1222 and the second manufacturer identification information 1213 stored in the storage unit 921 are referred to as the second manufacturer key 9211 and the second manufacturer identification information 9212.

Next, in Step S1705, the device key generation unit 811 of the first device management apparatus 800 uses the first manufacturer key 8211 and the GW identification information 8213 which is information for identifying the GW 400, to generate a GW key 8221 (see FIG. 5) which is the device key for the GW 400. Similarly, the device key generation unit 811 uses the first manufacturer key 8211 and the second in-vehicle device identification information 8214 which is information for identifying the second in-vehicle device 600, to generate a second in-vehicle device key 8222 which is the device key for the second in-vehicle device 600.

Note that the device key is also referred to as an authentication key or a device authentication key.

Specifically, the device key generation unit 811 generates the GW key 8221 and the second in-vehicle device key 8222 as follows.

First, the device key generation unit 811 randomly generates the character string, and the generated character string is the GW identification information 8213 and the second in-vehicle device identification information 8214. The device key generation unit 811 may select any of the device identification information as the GW identification information 8213 and the second in-vehicle device identification information 8214 from a list including multiple pieces of device identification information. Further, the device key generation unit 811 may also generate the GW identification information 8213 and the second in-vehicle device identification information 8214 by another method.

Next, the device key generation unit 811 uses the first manufacturer key 8211 and the GW identification information 8213 as inputs, to perform the key generation function. The key to be generated is the GW key 8221. Further, the device key generation unit 811 uses the first manufacturer key 8211 and the second in-vehicle device identification information 8214 as the inputs, to perform the key generation function. The key to be generated is the second in-vehicle device key 8222.

The device key generation unit 911 of the second device management apparatus 900 uses the second manufacturer key 9211 and the first in-vehicle device identification information 9213 which is information for identifying the first in-vehicle device 500, to generate the first in-vehicle device key 9221 (see FIG. 10). Similarly, the device key generation unit 911 uses the second manufacturer key 9211 and the third in-vehicle device identification information 9214 which is information for identifying the third in-vehicle device 700, to generate the third in-vehicle device key 9222.

Here, the first in-vehicle device key 9221 is the device key for the first in-vehicle device 500. Further, the third in-vehicle device key 9222 is the device key for the third in-vehicle device 700.

The method for generating the first in-vehicle device identification information 9213 and the first in-vehicle device key 9221 and the method for generating the third in-vehicle device identification information 9214 and the third in-vehicle device key 9222 are the same as the method for generating the GW identification information 8213 and the GW key 8221.

Next, in Step S1706, the transmitting unit 842 of the first device management apparatus 800 transmits the first manufacturer identification information 8212, the GW identification information 8213, and the GW key 8221 to the GW 400. Similarly, the transmitting unit 842 transmits the first manufacturer identification information 8212, the second in-vehicle device identification information 8214, and the second in-vehicle device key 8222 to the second in-vehicle device 600.

Further, the transmitting unit 942 of the second device management apparatus 900 transmits the second manufacturer identification information 9212, the first in-vehicle device identification information 9213, and the first in-vehicle device key 9221 to the first in-vehicle device 500. Similarly, the transmitting unit 942 transmits the second manufacturer identification information 9212, the third in-vehicle device identification information 9214, and the third in-vehicle device key 9222 to the third in-vehicle device 700.

Next, in Step S1707, the GW 400 receives the first manufacturer identification information 8212, the GW identification information 8213, and the GW key 8221 by the receiving unit 441, and stores the first manufacturer identification information 8212, the GW identification information 8213 and the GW key 8221 in the storage unit 421. Here, the first manufacturer identification information 8212, the GW identification information 8213, and the GW key 8221 stored in the storage unit 421 are referred to as the first manufacturer identification information 4211, the GW identification information 4212, and the GW key 4213.

Further, the first in-vehicle device 500 receives the second manufacturer identification information 9212, the first in-vehicle device identification information 9213, and the first in-vehicle device key 9221 by the receiving unit 541, and stores the second manufacturer identification information 9212, the first in-vehicle device identification information 9213, and the first in-vehicle device key 9221 in the storage unit 521. Here, the second manufacturer identification information 9212, the first in-vehicle device identification information 9213, and the first in-vehicle device key 9221 stored in the storage unit 521 are referred to as the second manufacturer identification information 5211, the first in-vehicle device identification information 5212, and the first in-vehicle device key 5213.

Further, the second in-vehicle device 600 receives the first manufacturer identification information 8212, the second in-vehicle device identification information 8214, and the second in-vehicle device key 8222 by the receiving unit 641, and stores the first manufacturer identification information 8212, the second in-vehicle device identification information 8214, and the second in-vehicle device key 8222 in the storage unit 621. Here, the first manufacturer identification information 8212, the second in-vehicle device identification information 8214, and the second in-vehicle device key 8222 stored in the storage unit 621 are referred to as the first manufacturer identification information 6211, the second in-vehicle device identification information 6212, and the second in-vehicle device key 6213.

Further, the third in-vehicle device 700 receives the second manufacturer identification information 9212, the third in-vehicle device identification information 9214, and the third in-vehicle device key 9222 by the receiving unit 741, and stores the received second manufacturer identification information 9212, the third in-vehicle device identification information 9214, and the third in-vehicle device key 9222 in the storage unit 721. Here, the second manufacturer identification information 9212, the third in-vehicle device identification information 9214, and the third in-vehicle device key 9222 stored in the storage unit 721 are referred to as the second manufacturer identification information 7211, the third in-vehicle device identification information 7212, and the third in-vehicle device key 7213.

As described above, by executing the flowchart shown in FIG. 17, unique device key are respectively set to the GW 400, the first in-vehicle device 500, the second in-vehicle device 600, and the third in-vehicle device 700.

The process from Step S1701 to Step S1704 in FIG. 17 is performed once at a stage before starting manufacturing of the GW 400, the first in-vehicle device 500, the second in-vehicle device 600, and the third in-vehicle device 700 in factories of the first manufacturer 801 and the second manufacturer 901. Further, the process from Step S1705 to Step S1707 is performed at a stage before the vehicle 300 is manufactured by the business operator 101, for example, at a stage of manufacturing the GW 400 and the second in-vehicle device 600 in the factory of the first manufacturer 801. Therefore, the business operator 101 purchases the GW 400, the first in-vehicle device 500, the second in-vehicle device 600, and the third in-vehicle device 700, in which the unique device key are set, from the first manufacturer 801 and the second manufacturer 901, and manufactures the vehicle 300 in the factory of the business operator 101.

Next, the operation for the GW 400 to share the key with the first in-vehicle device 500, the second in-vehicle device 600, and the third in-vehicle device 700 will be described with reference to FIG. 18.

First, in Step S1801, the GW 400 requests the first in-vehicle device 500 for information.

Figure 19:
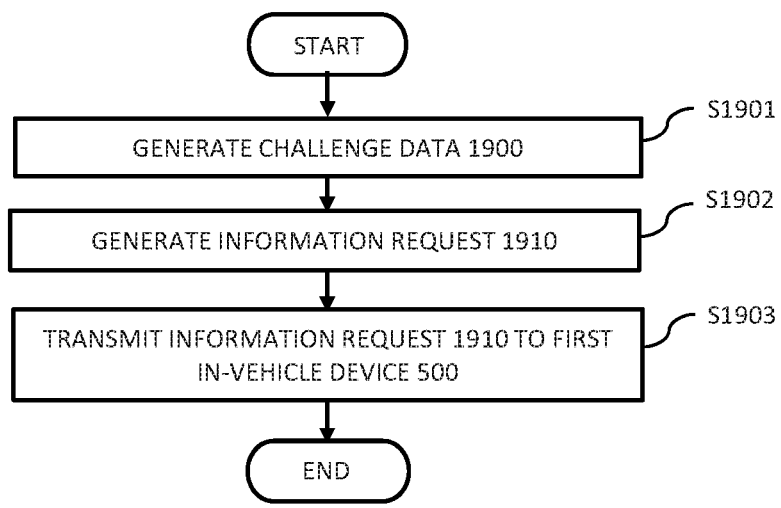
FIG. 19 is a flowchart of an information request process performed by the GW 400 according to the first embodiment of the present invention.

That is, as shown in FIG. 19, in Step S1901, the information request unit 411 of the GW 400 generates challenge data 1900 which is data called challenge in challenge-response authentication. Specifically, the information request unit 411 generates the random number, and the generated random number is the challenge data 1900.

Next, in Step S1902, the information request unit 411 generates an information request 1910 including the challenge data 1900 and the configuration information 4215.

Next, in Step S1903, the transmitting unit 442 refers to the configuration information 4215 to set as a transmission destination the first in-vehicle device network address 42151 set at a beginning of the configuration information 4215, and transmits the information request 1910.

Figure 18:
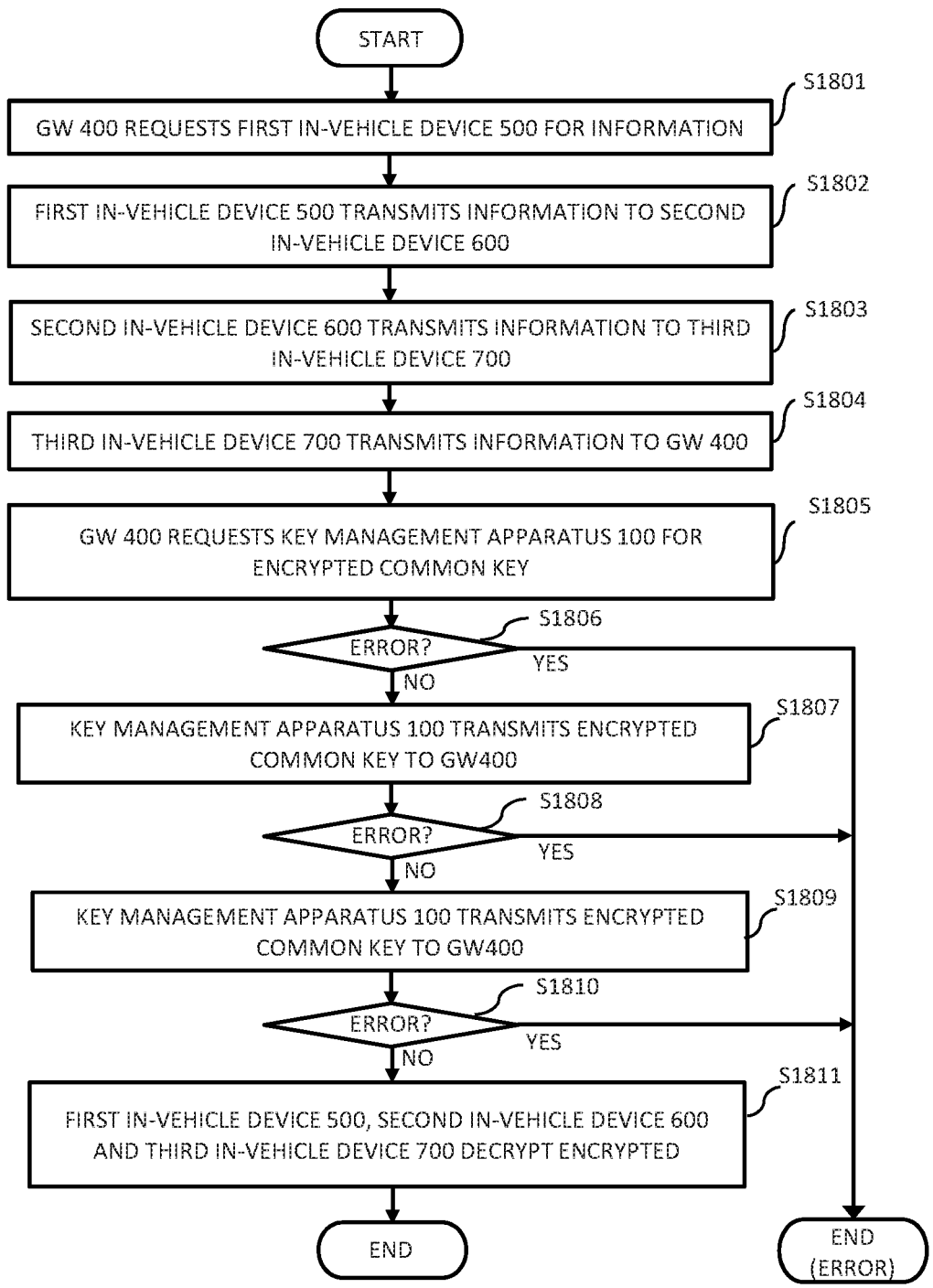
FIG. 18 is a flowchart of a common key sharing process according to Embodiment 1 of the present invention.

Next, in Step S1802 shown in FIG. 18, the first in-vehicle device 500 transmits the information to the second in-vehicle device 600.

Figure 20:
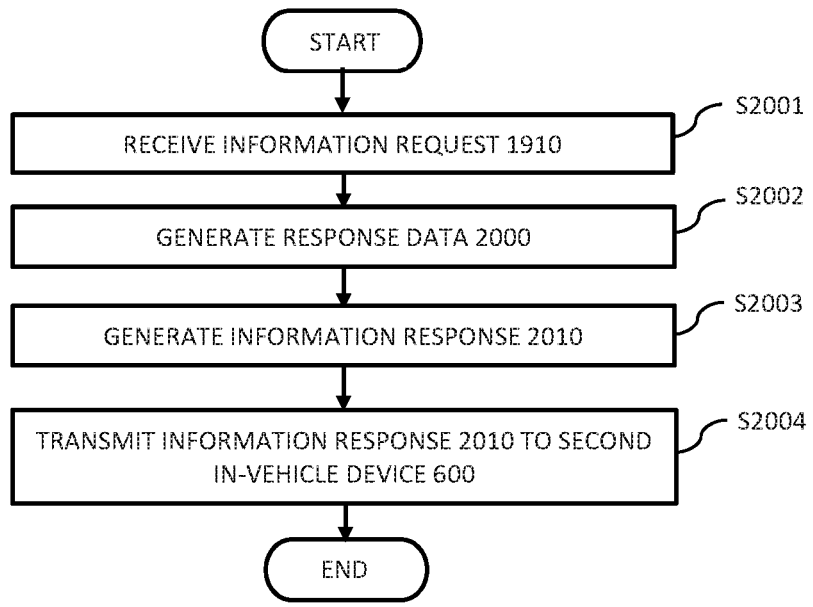
FIG. 20 is a flowchart of an information transmission process performed by the first in-vehicle device 500 according to Embodiment 1 of the present invention.

That is, as shown in FIG. 20, in Step S2001, the first in-vehicle device 500 receives the information request 1910 transmitted by the GW 400 in Step S1903 by the receiving unit 541, and in Step S2002, generates response data 2000 which is data called response in challenge-response authentication using the challenge data 1900 and the first in-vehicle device key 5213 by the information response unit 511. Specifically, the information response unit 511 generates the response data 2000 as follows.

First, the information response unit 511 obtains the challenge data 1900 from the received information request 1910, and generates the response data 2000 using the challenge data 1900 and the first in-vehicle device key 5213. Here, a value as a result of encrypting the challenge data 1900 with the first in-vehicle device key 5213 using an encryption algorithm is taken as the response data 2000. As the encryption algorithm to be used, there are AES (Advanced Encryption Standard), which is one of data encryption methods, and the like.

Next, in Step S2003, the information response unit 511 generates an information response 2010 including the challenge data 1900, the response data 2000, the second manufacturer identification information 5211, the first in-vehicle device identification information 5212, and the configuration information 4215.

Thereafter, in Step S2004, the transmitting unit 542 refers to the configuration information 4215 to set as the transmission destination the second in-vehicle device network address 42152 set next to the first in-vehicle device network address 42151 which is the network address of the first in-vehicle device 500, and transmits the information response 2010.

Next, in Step S1803 shown in FIG. 18, the second in-vehicle device 600 transmits the information to the third in-vehicle device 700.

Figure 21:
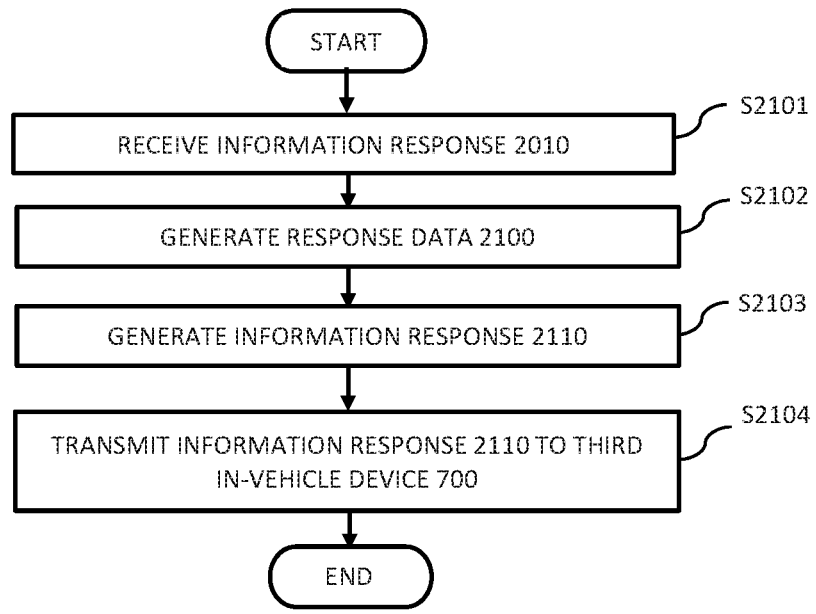
FIG. 21 is a flowchart of the information transmission process performed by the second in-vehicle device 600 according to Embodiment 1 of the present invention.

That is, as shown in FIG. 21, in Step S2101, the second in-vehicle device 600 receives the information response 2010 transmitted by the first in-vehicle device 500 in Step S2004 by the receiving unit 641, and in Step S2102, generates response data 2100 using the response data 2000 and the second in-vehicle device key 6213 by the information response unit 611. Specifically, the information response unit 611 generates the response data 2100 as follows.

First, the information response unit 611 obtains the response data 2000 from the received information response 2010, and generates the response data 2100 using the response data 2000 and the second in-vehicle device key 6213. Here, a value as a result of encrypting the response data 2000 with the second in-vehicle device key 6213 using the encryption algorithm is taken as the response data 2100. The encryption algorithm to be used is the same as that used by the first in-vehicle device 500 in Step S2002.

Next, in Step S2103, the information response unit 611 generates an information response 2110 including the challenge data 1900, the response data 2100, the first manufacturer identification information 6211, the second in-vehicle device identification information 6212, the second manufacturer identification information 5211, the first in-vehicle device identification information 5212, and the configuration information 4215.

Thereafter, in Step S2104, the transmitting unit 642 refers to the configuration information 4215 to set as the transmission destination the third in-vehicle device network address 42153 set next to the second in-vehicle device network address 42152 which is the network address of the second in-vehicle device 600, and transmits the information response 2110.

Next, in Step S1804 in FIG. 18, the third in-vehicle device 700 transmits the information to the GW 400.

Figure 22:
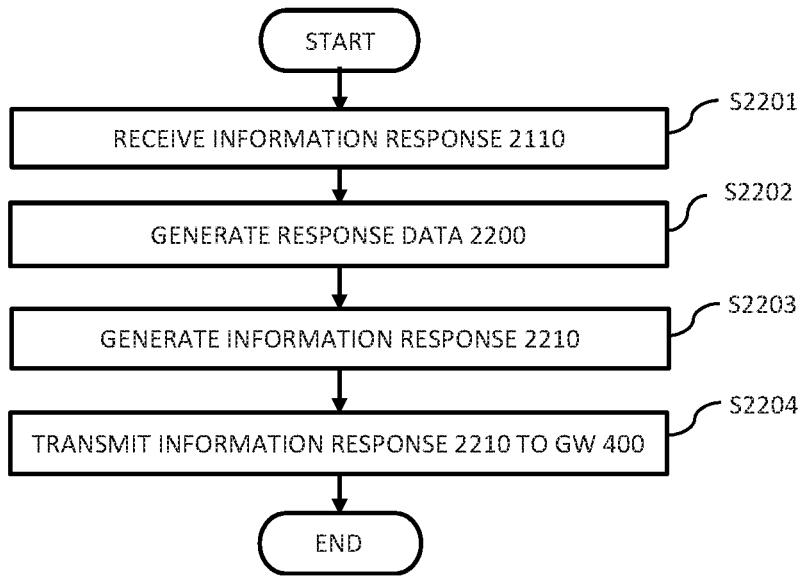
FIG. 22 is a flowchart of the information transmission process performed by the third in-vehicle device 700 according to Embodiment 1 of the present invention.

That is, as shown in FIG. 22, in Step S2201, the third in-vehicle device 700 receives the information response 2110 transmitted by the second in-vehicle device 600 in Step S2104 by the receiving unit 741, and in Step S2202, generates response data 2200 using the response data 2100 and the third in-vehicle device key 7213 by the information response unit 711. Specifically, the information response unit 711 of the third in-vehicle device 700 generates the response data 2200 as follows.

First, the information response unit 711 obtains the response data 2100 from the received information response 2110, and generates the response data 2200 using the response data 2100 and the third in-vehicle device key 7213. Here, a value as a result of encrypting the response data 2100 with the third in-vehicle device key 7213 using the encryption algorithm is taken as the response data 2200. The encryption algorithm to be used is the same as that used by the first in-vehicle device 500 in Step S2002.

Next, in Step S2203, the information response unit 711 generates an information response 2210 including the challenge data 1900, the response data 2200, the second manufacturer identification information 7211, the third in-vehicle device identification information 7212, the first manufacturer identification information 6211, the second in-vehicle device identification information 6212, the second manufacturer identification information 5211, the first in-vehicle device identification information 5212, and the configuration information 4215.

Thereafter, in Step S2204, the transmitting unit 742 refers to the configuration information 4215 to set as the transmission destination the GW network address 42154 set next to the third in-vehicle device network address 42153 which is the network address of the third in-vehicle device 700, and transmits the information response 2210.

Next, in Step S1805 in FIG. 18, the GW 400 requests an encrypted common key.

Figure 23:
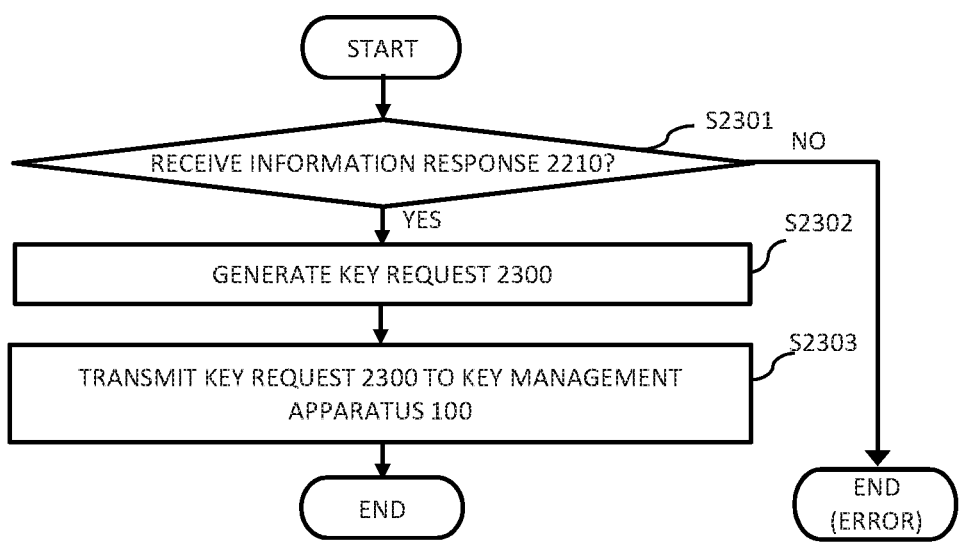
FIG. 23 is a flowchart of a key request process performed by the GW 400 according to Embodiment 1 of the present invention.

That is, as shown in FIG. 23, in Step S2301, the GW 400 receives the information response 2210 transmitted by the third in-vehicle device 700 in Step S2204 by the receiving unit 441.

The information response 2210 includes the challenge data 1900, the response data 2200, the second manufacturer identification information 7211, the third in-vehicle device identification information 7212, the first manufacturer identification information 6211, the second in-vehicle device identification information 6212, the second manufacturer identification information 5211, the first in-vehicle device identification information 5212 and the configuration information 4215.

Here, the common key request unit 412 of the GW 400 performs predetermined error determination, and immediately ends the flowchart if it determines that an error occurs. It is determined as the error, for example, if it does not receive the information response 2210 within a predetermined time, if a value of the challenge data 1900 included in the received information response 2210 is incorrect, or if the number of the manufacturer identification information and the in-vehicle device identification information included in the received information response 2210 does not match the number of in-vehicle devices set in the configuration information 4215.

On the other hand, when it is not determined as the error in Step S2301, the process proceeds to Step S2302, and the common key request unit 412 generates a key request 2300 including the first manufacturer identification information 4211, the GW identification information 4212, the challenge data 1900, the response data 2200, second manufacturer identification information 7211, the third in-vehicle device identification information 7212, the first manufacturer identification information 6211, the second in-vehicle device identification information 6212, the second manufacturer identification information 5211, and the first in-vehicle device identification information 5212, and in Step S2303, transmits the key request 2300 to the key management apparatus 100 by the transmitting unit 442.

Next, in Step S1806 shown in FIG. 18, the GW 400 determines whether determination of a key request process (Step S2301) in FIG. 23 ends with an error, and if it ends with the error, the GW 400 performs an error process and immediately ends a common key sharing flowchart shown in FIG. 18. In the error process, for example, an error LED is turned on, or alerts (all are not shown) indicating abnormal ends are displayed by a log management server, a test machine, a factory tool, or the like operating in the factory of the business operator 101.

On the other hand, if it does not end with the error, the process proceeds to Step S1807, and the key management apparatus 100 transmits the encrypted common key to the GW 400.

Figure 24:
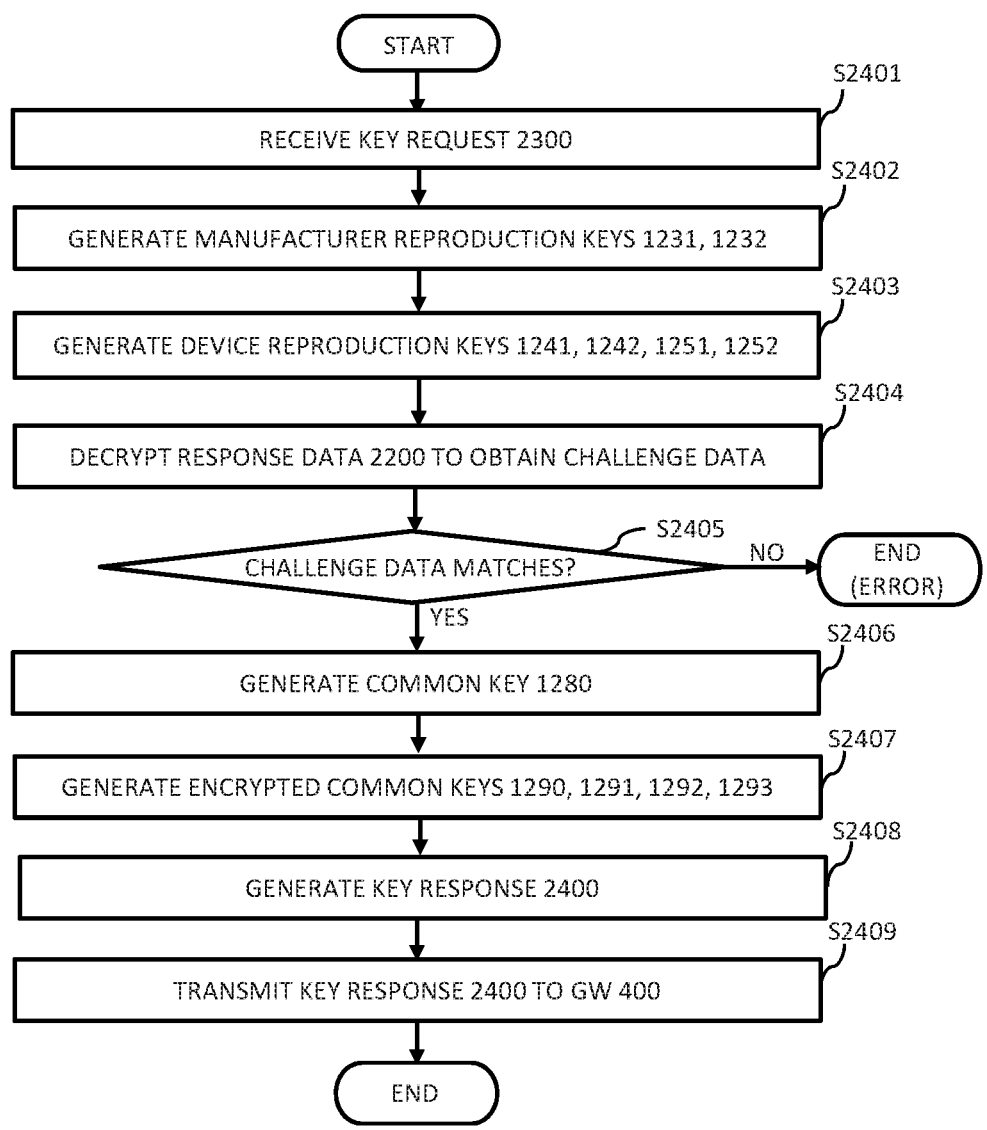
FIG. 24 is a flowchart of a key response process performed by the key management apparatus 100 according to Embodiment 1 of the present invention.

That is, as shown in FIG. 24, in Step S2401, the key management apparatus 100 receives the key request 2300 by the receiving unit 141.

The key request 2300 includes: the first manufacturer identification information 4211 and the GW identification information 4212, which are information of GW 400; the challenge data 1900; the response data 2200; the second manufacturer identification information 7211 and the third in-vehicle device identification information 7212, which are information of the third in-vehicle device 700; the first manufacturer identification information 6211 and the second in-vehicle device identification information 6212, which are information of the second in-vehicle device 600; and the second manufacturer identification information 5211 and the first in-vehicle device identification information 5212, which are information of the first in-vehicle device 500.

Next, in Step S2402, the key management apparatus 100 generates a first manufacturer key 1231 using the master key 1211 and the first manufacturer identification information 4211 by the manufacturer key generation unit 112. The first manufacturer key 1231 is the key corresponding to the first manufacturer key 1221 generated in Step S1702. Here, when the first manufacturer identification information 4211 is correct, the first manufacturer key 1231 matches the first manufacturer key 1221.

Further, the key management apparatus 100 generates a second manufacturer key 1232 using the master key 1211 and the second manufacturer identification information 7211 by the manufacturer key generation unit 112. The second manufacturer key 1232 is the key corresponding to the second manufacturer key 1222 generated in Step S1702. Here, when the second manufacturer identification information 5211 is correct, the second manufacturer key 1232 matches the second manufacturer key 1222.

The manufacturer key generation unit 112 generates manufacturer keys respectively from the master key 1211 and the first manufacturer identification information 6211, and the master key 1211 and the second manufacturer identification information 5211. However, in this embodiment, since the first manufacturer identification information 6211 is the same as the first manufacturer identification information 4211 and the second manufacturer identification information 5211 is the same as the second manufacturer identification information 7211, the manufacturer keys are not generated. Further, the method of generating the first manufacturer key 1231 and the second manufacturer key 1232 is the same as the method of generating the first manufacturer key 1221 and the second manufacturer key 1222 in Step S1702 of FIG. 17.

Next, in Step S2403, the key management apparatus 100 generates the GW key 1241 using the first manufacturer key 1231 and the GW identification information 4212 by the device key generation unit 113. The GW key 1241 is the key corresponding to the GW key 8221 generated by the device key generation unit 811 of the first device management apparatus 800 in Step S1705 and the GW key 4213 stored in the storage unit 421 of the GW 400 in Step S1707. Here, when the first manufacturer key 1231 and the GW identification information 4212 are correct, the GW key 1241 matches the GW key 8221 and the GW key 4213.

Further, the key management apparatus 100 generates a second in-vehicle device key 1242 using the first manufacturer key 1231 and the second in-vehicle device identification information 6212 by the device key generation unit 113. Here, if the first manufacturer key 1231 and the second in-vehicle device identification information 6212 are correct, the second in-vehicle device key 1242 matches the second in-vehicle device key 8222 generated by the device key generation unit 811 of the first device management apparatus 800 in Step S1705 and the second in-vehicle device key 6213 stored in the storage unit 621 of the second in-vehicle device 600 in Step S1707.

Furthermore, the key management apparatus 100 generates a first in-vehicle device key 1251 using the second manufacturer key 1232 and the first in-vehicle device identification information 5212 by the device key generation unit 113. The first in-vehicle device key 1251 is the key corresponding to the first in-vehicle device key 9221 generated by the device key generation unit 911 of the second device management apparatus 900 in Step S1705 and the first in-vehicle device key 5213 stored in the storage unit 521 of the first in-vehicle device 500 in Step S1707. Here, when the second manufacturer key 1232 and the first in-vehicle device identification information 5212 are correct, the first in-vehicle device key 1251 matches the first in-vehicle device key 9221 and the first in-vehicle device key 5213.

Further, the key management apparatus 100 generates a third in-vehicle device key 1252 using the second manufacturer key 1232 and the third in-vehicle device identification information 7212 by the device key generation unit 113. Here, if the second manufacturer key 1232 and the third in-vehicle device identification information 7212 are correct, the third in-vehicle device key 1252 matches the third in-vehicle device key 9222 generated by the device key generation unit 911 of the second device management apparatus 900 in Step S1705 and the third in-vehicle device key 7213 stored in the storage unit 721 of the third in-vehicle device 700 in Step S1707.

The method of generating the GW key 1241, the second in-vehicle device key 1242, the first in-vehicle device key 1251 and the third in-vehicle device key 1252 is the same as the method of generating the GW key 8221, the second in-vehicle device key 8222, the first in-vehicle device key 9221 and the third in-vehicle device key 9222 in Step S1705 of FIG. 17.

Next, in Step S2404, the key management apparatus 100 decrypts the response data 2200 by the authentication information verification unit 114 using the device key reproduced in Step S2403.

Figure 25:
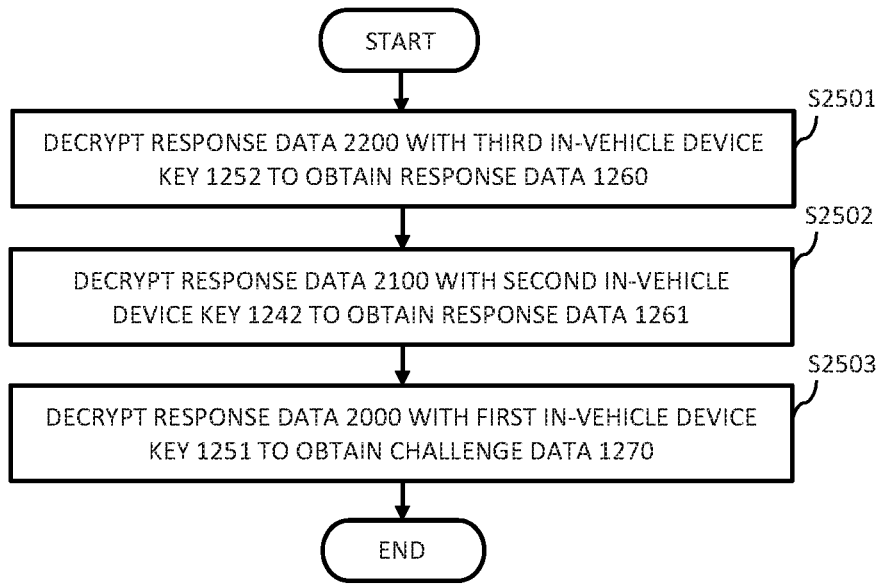
FIG. 25 is a flowchart of a response decryption process performed by the key management apparatus 100 according to Embodiment 1 of the present invention.

That is, as shown in FIG. 25, in Step S2501, the key management apparatus 100 decrypts the response data 2200 by the authentication information verification unit 114 using the third in-vehicle device key 1252. The decrypted value is taken as response data 1260.

Next, in Step S2502, the key management apparatus 100 decrypts the response data 1260 by the authentication information verification unit 114 using the second in-vehicle device key 1242. The decrypted value is taken as response data 1261.

Further, in Step S2503, the key management apparatus 100 decrypts the response data 1261 by the authentication information verification unit 114 using the first in-vehicle device key 1251. The decrypted value is taken as challenge data 1270.

The encryption algorithm used for decryption in each of Steps S2501 to S2503 is the same as that used by the first in-vehicle device 500 in Step S2002.

Next, in Step S2405 shown in FIG. 24, the authentication information verification unit 114 compares the challenge data 1270 with the challenge data 1900 included in the key request 2300, and if the challenge data 1270 does not match the challenge data 1900, it ends a key response process flowchart shown in FIG. 24. At this end, an error response notifying the error may be transmitted to the GW 400 instead of the key response.

On the other hand, if the challenge data 1270 matches the challenge data 1900, the process proceeds to Step S2406, and in Step S2406, the common key generation unit 115 of the key management apparatus 100 generates a common key 1280. The common key 1280 is an authentication key shared by the GW 400, the first in-vehicle device 500, the second in-vehicle device 600, and the third in-vehicle device 700. Specifically, the common key generation unit 115 generates the random number, and uses the generated random number as the input to perform the key generation function.

Next, in Step S2407, the encrypted common key generation unit 116 of the key management apparatus 100 encrypts the common key 1280 using the GW key 1241 and generates a first encrypted common key 1290.

Similarly, the encrypted common key generation unit 116 encrypts the common key 1280 using the first in-vehicle device key 1251 to generate a second encrypted common key 1291, encrypts the common key 1280 using the second in-vehicle device key 1242 to generate a third encrypted common key 1292, and encrypts the common key 1280 using the third in-vehicle device key 1252 to generate a fourth encrypted common key 1293.

Specifically, the encrypted common key generation unit 116 encrypts the common key 1280 by authenticated encryption method. More specifically, the encrypted common key generation unit 116 uses the device key and the common key 1280 as the inputs, to perform an encryption function of the authenticated encryption method. The device key to be input is the GW key 1241, the first in-vehicle device key 1251, the second in-vehicle device key 1242, or the third in-vehicle device key 1252.

Next, in Step S2408, the key response generation unit 117 generates a key response 2400 including the first encrypted common key 1290, the second encrypted common key 1291, the third encrypted common key 1292 and the fourth encrypted common key 1293, and transmits the key response 2400 to the GW 400 by the transmitting unit 142 in Step S2409.

Next, in Step S1808 shown in FIG. 18, if the key response process flowchart shown in FIG. 24 ends in error, the error process is performed and the common key sharing flowchart is immediately ended.

On the other hand, if the key response process flowchart shown in FIG. 24 ends normally, the process proceeds to Step S1809, and in Step S1809, the GW 400 decrypts the encrypted common key into the common key.

Figure 26:
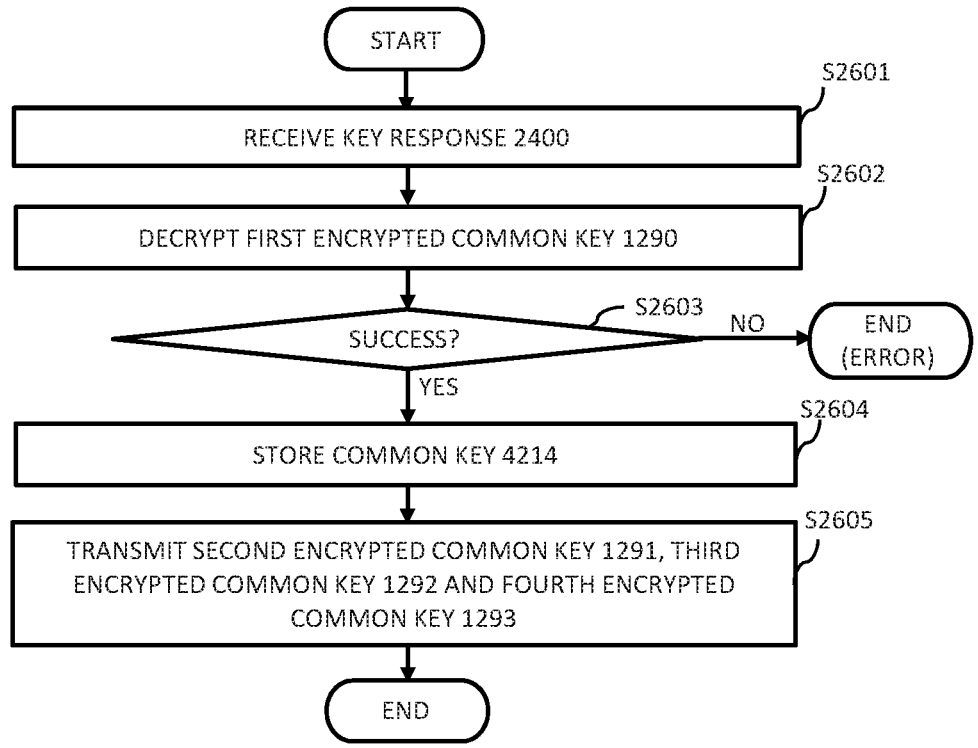
FIG. 26 is a flowchart of the decryption process performed by the GW 400 according to Embodiment 1 of the present invention.

Here, as shown in FIG. 26, in Step S2601, the receiving unit 441 of the GW 400 receives the key response 2400. The key response 2400 includes the first encrypted common key 1290, the second encrypted common key 1291, the third encrypted common key 1292 and the fourth encrypted common key 1293.

Next, in Step S2602, the common key decryption unit 413 of the GW 400 decrypts the first encrypted common key 1290 using the GW key 4213. Specifically, the common key decryption unit 413 decrypts the first encrypted common key 1290 by the authenticated encryption method. More specifically, the common key decryption unit 413 uses the GW key 4213 and the first encrypted common key 1290 as the inputs, to perform a decryption function of the authenticated encryption method.

In the decryption in the authenticated encryption method, the authentication and the decryption are performed, and the decryption is successful if the authentication is successful. Conversely, if the authentication fails, the decryption fails.

Next, the process proceeds to Step S2603, and if the decryption is successful in Step S2602, the process proceeds to Step S2604. If the decryption fails, a key decryption process flowchart shown in FIG. 26 ends.

Next, in Step S2604, the storage unit 421 of the GW 400 stores the result of decrypting the first encrypted common key 1290 in Step S2602 as the common key 4214. The common key 4214 is the same key as the common key 1280 generated by the key management apparatus 100 in Step S2406.

Next, in Step S2605, the transmitting unit 442 of the GW 400 transmits remaining data obtained by removing the first encrypted common key 1290 from the key response 2400, that is, the data including the second encrypted common key 1291, the third encrypted common key 1292 and the fourth encrypted common key 1293 so as to reach all network addresses set in the configuration information 4215 with reference to the configuration information 4215. This transmission is broadcast transmission.

Next, in Step S1810 shown in FIG. 18, if the key decryption process flowchart shown in FIG. 26 ends in error, the error process is performed and the common key sharing flowchart is immediately ended. If the key decryption process flowchart ends normally, the process proceeds to Step S1811, and in Step S1811, the first in-vehicle device 500, the second in-vehicle device 600, and the third in-vehicle device 700 decrypt the encrypted common key into the common key.

Figure 27:
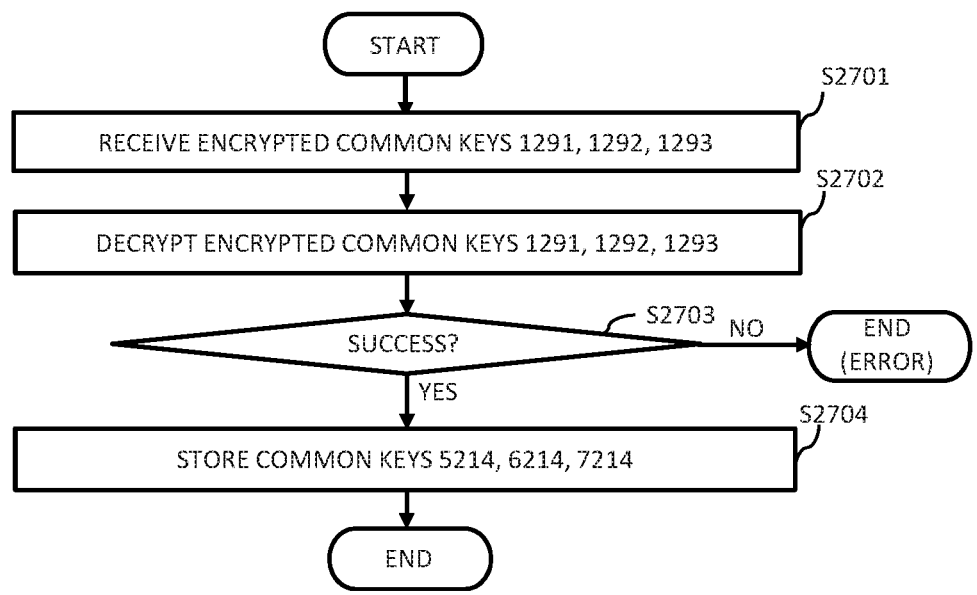
FIG. 27 is a flowchart of the decryption process performed by the first in-vehicle device 500, the second in-vehicle device 600, and the third in-vehicle device 700 according to Embodiment 1 of the present invention.

That is, as shown in FIG. 27, in Step S2701, the receiving unit 541 of the first in-vehicle device 500, the receiving unit 641 of the second in-vehicle device 600, and the receiving unit 741 of the third in-vehicle device 700 respectively receives data including the second encrypted common key 1291, the third encrypted common key 1292 and the fourth encrypted common key 1293, and the common key decryption unit 512 of the first in-vehicle device 500 decrypts the second encrypted common key 1291 using the first in-vehicle device key 5213 in Step S2702. Specifically, the common key decryption unit 512 decrypts the second encrypted common key 1291 by the authenticated encryption method. More specifically, the common key decryption unit 512 uses the first in-vehicle device key 5213 and the second encrypted common key 1291 as the inputs, to perform the decryption function of the authenticated encryption method.

In the decryption in the authenticated encryption method, the authentication and the decryption are performed, and the decryption is successful if the authentication is successful, and the decryption fails if the authentication fails.

Similarly, the common key decryption unit 612 of the second in-vehicle device 600 decrypts the third encrypted common key 1292 using the second in-vehicle device key 6213, and the common key decryption unit 712 of the third in-vehicle device 700 decrypts the fourth encrypted common key 1293 using the third in-vehicle device key 7213.

The decryption method in the common key decryption unit 612 and the common key decryption unit 712 is the same as the decryption method in the common key decryption unit 512.

Next, in Step S2703, if the decryption is successful in Step S2702, the process proceeds to Step S2704, and if the decryption fails, the key decryption process flowchart shown in FIG. 27 ends.

Next, in Step S2704, the storage unit 521 of the first in-vehicle device 500 stores the result of decrypting the second encrypted common key 1291 in Step S2702 as the common key 5214. The common key 5214 is the same key as the common key 1280 generated by the key management apparatus 100 in Step S2406.

Similarly, the storage unit 621 of the second in-vehicle device 600 stores the result of decrypting the third encrypted common key 1292 in Step S2702 as the common key 6214. The common key 6214 is the same key as the common key 1280 generated by the key management apparatus 100 in Step S2406.

Similarly, the storage unit 721 of the third in-vehicle device 700 stores the result of decrypting the fourth encrypted common key 1293 in Step S2702 as the common key 7214. The common key 7214 is the same key as the common key 1280 generated by the key management apparatus 100 in Step S2406.

As described above, with the key sharing system according to Embodiment 1 of the present invention, the GW 400, the first in-vehicle device 500, the second in-vehicle device 600, and the third in-vehicle device 700 share the same key, and after the common key is shared, they can perform, for example, device authentication, message authentication, message encryption, or the like using the common key.

Therefore, the data can be safely communicated among the GW 400, the first in-vehicle device 500, the second in-vehicle device 600, and the third in-vehicle device 700.

Further, with the key sharing system according to Embodiment 1 of the present invention, when the GW 400 performs key sharing with the first in-vehicle device 500, the second in-vehicle device 600, and the third in-vehicle device 700, the data exchanged between the key management apparatus 100 and the GW 400 is only the key request 2300 and the key response 2400, which makes it possible to shorten an overall processing time required for the key sharing process.

Particularly, in order to simplify the description in the above description, it was assumed that only three in-vehicle devices of the first in-vehicle device 500, the second in-vehicle device 600, and the third in-vehicle device 700 are present in the vehicle 300. However, since several tens to one hundred and several tens of in-vehicle devices are mounted on an actual automobile vehicle, it is possible to obtain a great effect in reducing the number of data exchanged between the key management apparatus 100 and the GW 400 by the present invention.

In the embodiment described above, the following modifications can be made.

First, in the generation of response data of the first in-vehicle device 500, the second in-vehicle device 600, and the third in-vehicle device 700 to the challenge transmitted by the GW 400, it is desirable to use the random number in the encryption as Nonce (Number Used Once: hereinafter, referred to as Nonce) which is a disposable value. Specifically, in Step S2002 shown in FIG. 20, the information response unit 511 of the first in-vehicle device 500 generates the random number, and uses the random number as the Nonce, to set the value as a result of encrypting the challenge data 1900 with the first in-vehicle device key 5213 and the Nonce as the response data 2000. Further, in Step S2003, the information response unit 511 includes the Nonce in the information response 2010.

Further, the second in-vehicle device 600 and the third in-vehicle device 700 similarly generate the random number and perform encryption using the random number as the Nonce. In addition, information of the Nonce is included in the information response.

Further, in Step S1805 shown in FIG. 18, the GW 400 includes Nonces, that have been included in the information response by the first in-vehicle device 500, the second in-vehicle device 600, and the third in-vehicle device 700, in the key request 2300 as they are, and transmits the key request 2300 to the key management apparatus 100. In Step S2404 shown in FIG. 24, the authentication information verification unit 114 of the key management apparatus 100 decrypts the response data using the Nonces in the response decryption process.

Second, in the generation of response data of the first in-vehicle device 500, the second in-vehicle device 600, and the third in-vehicle device 700 to the challenge transmitted by the GW 400, an authentication code may be generated instead of encryption. Specifically, in Step S2002 shown in FIG. 20, the information response unit 511 of the first in-vehicle device 500 sets the value as a result of generating the authentication code with the first in-vehicle device key 5213 for the challenge data 1900 as the response data 2000. Further, in Step S2102 shown in FIG. 21, the information response unit 611 of the second in-vehicle device 600 sets the value as a result of generating the authentication code with the second in-vehicle device key 6213 for the response data 2000 as the response data 2100. Further, in Step S2202 shown in FIG. 22, the information response unit 711 of the third in-vehicle device 700 sets the value as a result of generating the authentication code with the third in-vehicle device key 7213 for the response data 2100 as the response data 2200.

Figure 28:
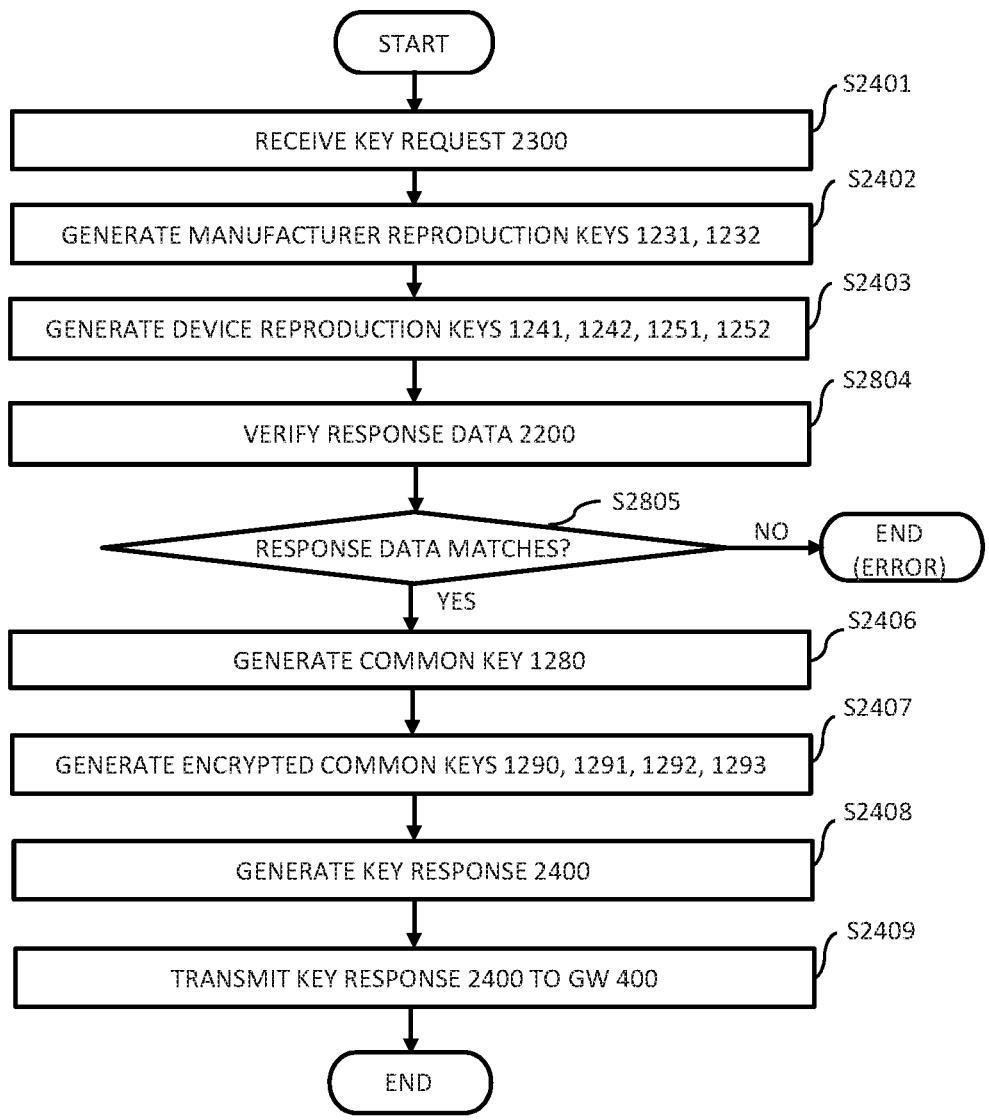
FIG. 28 is a flowchart of another key response process performed by the key management apparatus 100 according to Embodiment 1 of the present invention.

When using the authentication codes, in Step S1807, the key management apparatus 100 executes the flowchart shown in FIG. 28 instead of the flowchart shown in FIG. 24. Here, since Steps S2401 to S2403 shown in FIG. 28 are the same as Steps S2401 to S2403 shown in FIG. 24, the description will be omitted.

Next, in Step S2804, the authentication information verification unit 114 of the key management apparatus 100 verifies the response data 2200 included in the key request 2300.

Figure 29:
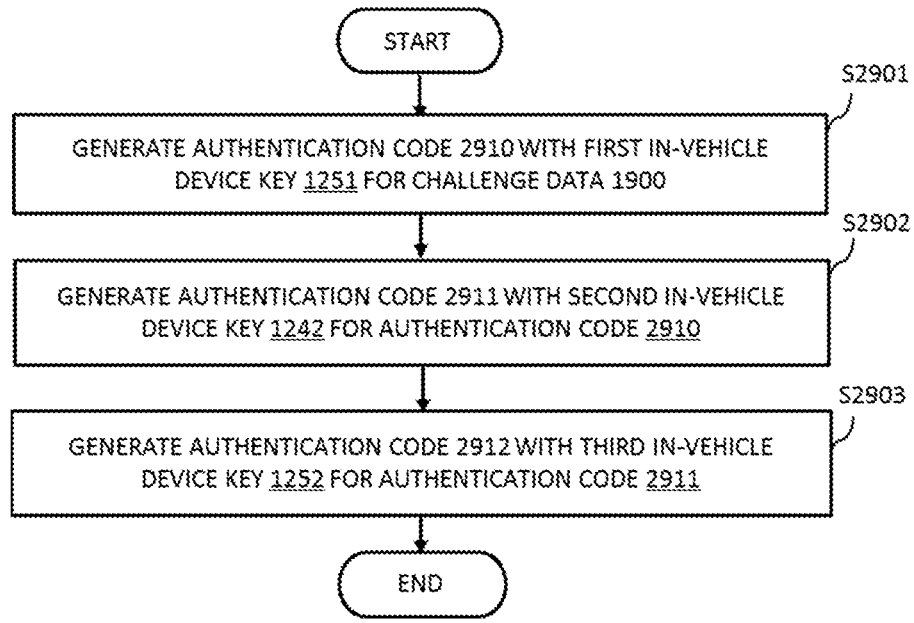
FIG. 29 is a flowchart of another verification process performed by the key management apparatus 100 according to Embodiment 1 of the present invention.

FIG. 29 shows a flowchart of this verification process. In Step S2901, the authentication information verification unit 114 generates an authentication code 2910 with the first in-vehicle device key 1251 for the challenge data 1900 included in the key request 2300.

Next, in Step S2902, the authentication information verification unit 114 generates an authentication code 2911 with the second in-vehicle device key 1242 for the authentication code 2910, and in Step S2903, generates an authentication code 2912 with the third in-vehicle device key 1252 for the authentication code 2911.

Thereafter, in Step S2805 shown in FIG. 28, the authentication information verification unit 114 determines whether the value of the authentication code 2912 obtained as a result of performing the verification process shown in FIG. 29 matches the response data 2200 included in the key request 2300. If it does match, the process proceeds to Step S2406.

Since Steps S2406 to S2409 shown in FIG. 28 are the same as Steps S2406 to S2409 in FIG. 24, the description will be omitted.

Third, common keys shared between the GW 400 and the first in-vehicle device 500, the GW 400 and the second in-vehicle device 600, and the GW 400 and the third in-vehicle device 700 may all be different. Specifically, in Step S2406 shown in FIG. 24, the common key generation unit 115 generates three types of common keys of a first common key, a second common key, and a third common key. In Step S2407, the encrypted common key generation unit 116 encrypts the first common key, the second common key, and the third common key using the GW key 1241 to generate the first encrypted common key 1290. Similarly, the encrypted common key generation unit 116 encrypts the first common key using the first in-vehicle device key 1251 to generate the second encrypted common key 1291, encrypts the second common key using the second in-vehicle device key 1242 to generate the third encrypted common key 1292, and encrypts the third common key using the third in-vehicle device key 1252 to generate the fourth encrypted common key 1293.

Here, a plurality of keys may be shared by the GW 400, the first in-vehicle device 500, the second in-vehicle device 600, and the third in-vehicle device 700. Specifically, in Step S2406 shown in FIG. 24, the common key generation unit 115 generates a plurality of common keys, and in Step S2407, the encrypted common key generation unit 116 encrypts the plurality of common keys using the GW key 1241 to generate a plurality of first encrypted common keys 1290, encrypts the plurality of common keys using the first in-vehicle device key 1251 to generate a plurality of second encrypted common keys 1291, encrypts the plurality of common keys using the in-vehicle device key 1242 to generate a plurality of third encrypted common keys 1292, and encrypts the plurality of common keys using the third in-vehicle device key 1252 to generate a plurality of fourth encrypted common keys 1293.

Fourth, when the GW 400 transmits the encrypted common keys to the first in-vehicle device 500, the second in-vehicle device 600, and the third in-vehicle device 700, only the encrypted common keys respectively corresponding to the in-vehicle devices may be individually transmitted to the in-vehicle devices instead of the broadcast transmission. Specifically, in Step S2605 illustrated in FIG. 26, the transmitting unit 442 of the GW 400 does not broadcast the second encrypted common key 1291, the third encrypted common key 1292, and the fourth encrypted common key 1293, but refers to the configuration information 4215, to transmit the second encrypted common key 1291 to the first in-vehicle device network address 42151 which is the network address of the first in-vehicle device 500, to transmit the third encrypted common key 1292 to the second in-vehicle device network address 42152 which is the network address of the second in-vehicle device 600, and to transmit the fourth encrypted common key 1293 to the third in-vehicle device network address 42153 which is the network address of the third in-vehicle device 700.

The configuration information 4215 may be distributed to the first in-vehicle device 500, the second in-vehicle device 600, and the third in-vehicle device 700 before the common key sharing flowchart shown in FIG. 18 is executed. In this case, transmission of the configuration information 4215 is not necessary in each of Steps S1801 to S1804 shown in FIG. 18.

Further, among contents of the configuration information 4215, only the information of the second in-vehicle device network address 42152 which is the next destination may be distributed to the first in-vehicle device 500, and similarly, only the information of the third in-vehicle device network address 42153 may be distributed to the second in-vehicle device 600, and only the information of the GW network address 42154 may be distributed to the third in-vehicle device 700.

Fifth, storage of the common key 4214 by the GW 400, storage of the common key 5214 by the first in-vehicle device 500, storage of the common key 6214 by the second in-vehicle device 600, and storage of the common key 7214 by the third in-vehicle device 700 may be configured to be performed after verification on each device is successful.

Specifically, if the decryption of the encrypted common key is successful in Step S2702 shown in FIG. 27, the first in-vehicle device 500, the second in-vehicle device 600, and the third in-vehicle device 700 transmit a success notification to the GW 400. Conversely, if the decryption of the encrypted common key fails, a failure notification is transmitted to the GW 400. Here, when the success notification is received from all the first in-vehicle device 500, the second in-vehicle device 600, and the third in-vehicle device 700, the GW 400 broadcasts a sharing success notification after storing the common key 4214. When the first in-vehicle device 500, the second in-vehicle device 600, and the third in-vehicle device 700 receive the sharing success notification, they respectively store the common key 5214, the common key 6214, and the common key 7214.

Embodiment 2

Figure 30:
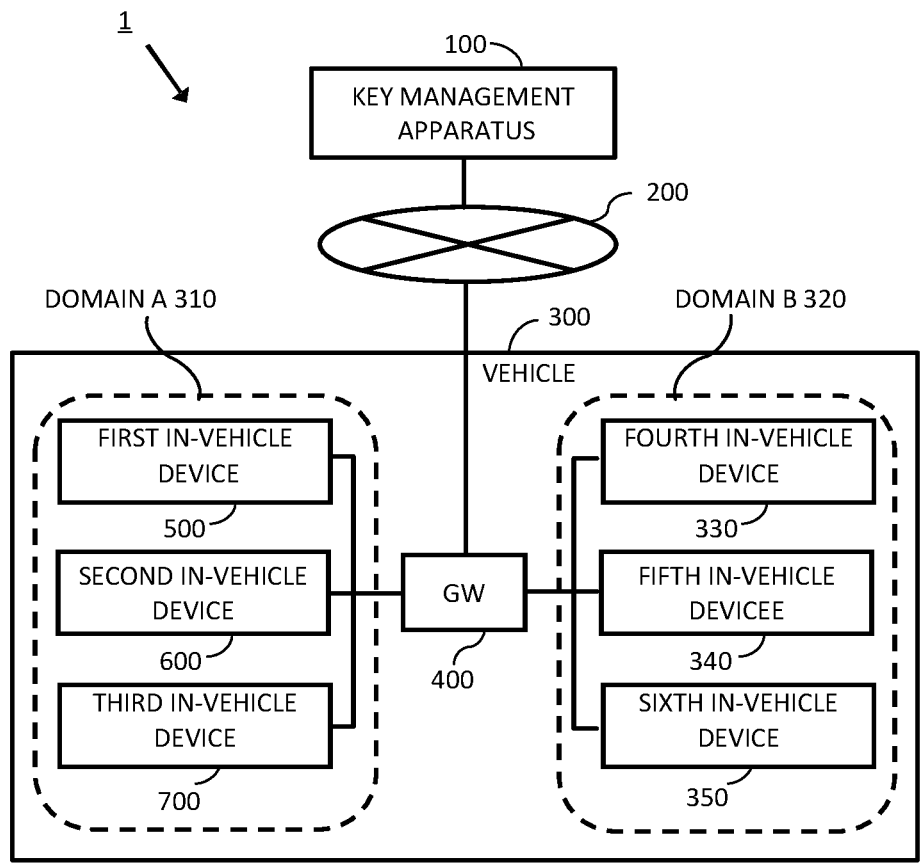
FIG. 30 is a schematic view showing the entire system of the key sharing system according to Embodiment 2 of the present invention.

In Embodiment 1 described above, the GW 400 is configured to share keys simultaneously for all the in-vehicle devices present in the vehicle 300. However, when a network in the vehicle 300 is divided into units called domains, and each in-vehicle device is configured to belong to one of the domains depending on its function, the key sharing process may be performed on a domain basis, and such an embodiment is shown in FIG. 30. The domains include, for example, a body system, an information system, and a power system.

In FIG. 30, the vehicle 300 includes the GW 400, the first in-vehicle device 500, the second in-vehicle device 600, the third in-vehicle device 700, a fourth in-vehicle device 330, a fifth in-vehicle device 340, and a sixth in-vehicle device 350, and is divided into a domain A310 including the first in-vehicle device 500, the second in-vehicle device 600, and the third in-vehicle device 700, and a domain B320 including the fourth in-vehicle device 330, the fifth in-vehicle device 340, and the sixth in-vehicle device 350.

The key management apparatus 100, the network 200, the GW 400, the first in-vehicle device 500, the second in-vehicle device 600, and the third in-vehicle device 700 are the same as those described in Embodiment 1. Further, since the configurations of the fourth in-vehicle device 330, the fifth in-vehicle device 340, and the sixth in-vehicle device 350 are the same as those of the first in-vehicle device 500, the second in-vehicle device 600, and the third in-vehicle device 700, the description will be omitted.

Figure 31:
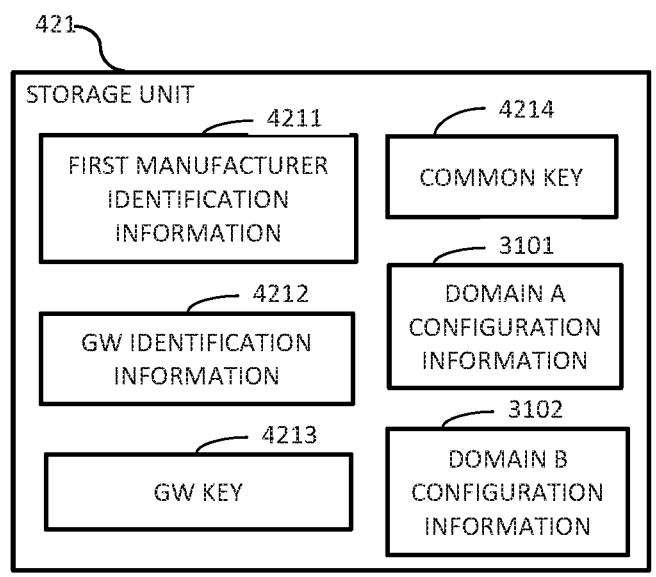
FIG. 31 is a diagram showing the data structure stored in the storage unit 421 of the GW 400 according to Embodiment 2 of the present invention.

Here, the above-mentioned domain A310 and domain B320 are connected to the GW 400 via the cables, and when communication is performed between the in-vehicle device belonging to the domain A310 and the in-vehicle device belonging to the domain B320, the communication is performed through the GW 400. Further, as shown in FIG. 31, the GW 400 is configured to store a domain A configuration information 3101 and a domain B configuration information 3102 in the storage unit 421.

Figure 32:
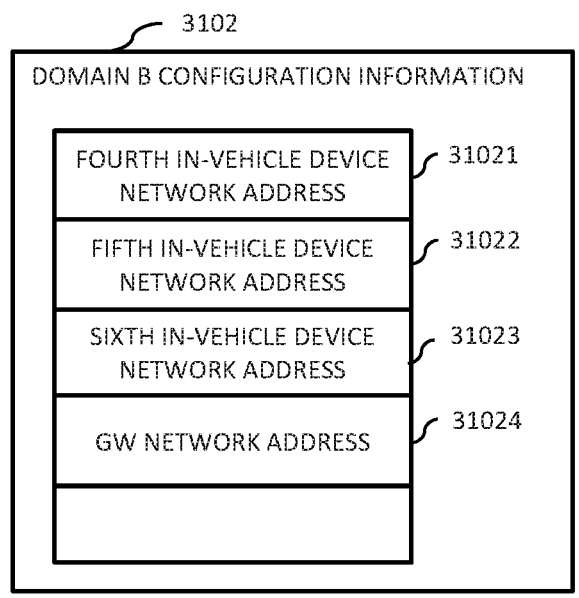
FIG. 32 is a diagram for explaining an example of domain B configuration information 3102 according to Embodiment 2 of the present invention.

The first manufacturer identification information 4211, the GW identification information 4212, the GW key 4213, and the common key 4214 are the same as those in Embodiment 1. Further, the domain A configuration information 3101 is the same as the configuration information 4215 in Embodiment 1. Further, as shown in FIG. 32, in the domain B configuration information 3102, a fourth in-vehicle device network address 31021 which is a value of the network address of the fourth in-vehicle device 330, a fifth in-vehicle device network address 31022 which is the value of the network address of the fifth in-vehicle device 340, a sixth in-vehicle device network address 31023 which is the value of the network address of the sixth in-vehicle device 350, and a GW network address 31024 are set. Further, the GW network address 31024 which is the value of the network address of the GW 400 is set. The GW network address 31024 is the same as the GW network address 42154 in Embodiment 1.

Next, an operation in Embodiment 2 will be described.

In the key sharing system according to Embodiment 2, the GW 400 performs key sharing process on a domain basis. Specifically, first, the GW 400 executes the key sharing flowchart shown in FIG. 18 for the first in-vehicle device 500, the second in-vehicle device 600, and the third in-vehicle device 700 belonging to the domain A310. At this time, in Step S1902 shown in FIG. 19, the domain A configuration information 3101 is used as information included in the information request 1910. As a result of executing the key sharing flowchart shown in FIG. 18, the GW 400 and the first in-vehicle device 500, the second in-vehicle device 600, and the third in-vehicle device 700 can share the common key.

Next, the GW 400 executes the same key sharing flowchart as in FIG. 18 for the fourth in-vehicle device 330, the fifth in-vehicle device 340, and the sixth in-vehicle device 350 belonging to the domain B320. At this time, the domain B configuration information 3102 is used as the information included in the information request 1910. Thus, the GW 400 and the fourth in-vehicle device 330, the fifth in-vehicle device 340, and the sixth in-vehicle device 350 can share the common key. Here, the common key to be shared is a key different from the common key shared with the in-vehicle devices belonging to the domain A310.

Note that the functions of the key management apparatus 100, the first device management apparatus 800, the GW 400, the second device management apparatus 900, the first in-vehicle device 500, the second in-vehicle device 600, and the third in-vehicle device 700 may be realized by combination of software and hardware. That is, a part of the functions of the "units" may be realized by the software, and the rest of the functions of the "units" may be realized by the hardware.

As described above, with the key sharing system according to Embodiment 2, the GW 400 shares the common key with the in-vehicle devices in each domain, and thus it is possible to safely perform data communication only between the in-vehicle devices in the same domain. Moreover, also in Embodiment 2, it is possible to obtain an effect that data exchanged between the key management apparatus 100 and the GW 400 can be reduced as compared with the case where the key sharing process is performed individually with the in-vehicle devices.

In the above-described embodiments, the GW 400 is configured as an internal device of the vehicle 300. However, the GW 400 may be provided outside the vehicle 300 and configured to maintain thein-vehicle devices from the outside. The present invention is not limited to the vehicle 300, but can be applied to a communication system in which the master station having the key management apparatus and the slave station having the plurality of terminal devices are communicated through the network.

Furthermore, the above-described embodiments are examples of the preferred embodiments, and the embodiments may be partially implemented or may be implemented in combination with other embodiments, and the procedure described using the flowchart or the like may be changed as appropriate.

DESCRIPTION OF REFERENCE NUMERALS AND SIGNS

1: key sharing system, 100: key management apparatus, 101: business operator, 111: master key generation unit, 112:

manufacturer key generation unit, 113: device key generation unit, 114: authentication information verification unit, 115: common key generation unit, 116: encrypted common key generation unit, 117: key response generation unit, 141: receiving unit, 142: transmitting unit, 200: network, 300: vehicle, 400: gateway (GW), 500: first in-vehicle device, 600: second in-vehicle device, 700: third in-vehicle device, 800: first device management apparatus, 801: first manufacturer, 900: second device management apparatus, 901: second manufacturer.

The invention claimed is:

1. A key management system for communicating between a master station having a key management apparatus and a slave station having a plurality of terminal devices connected thereto via a network and the slave station sharing keys with the plurality of terminal devices, wherein
the key management apparatus comprises:
a receiving unit for receiving a key request including communication device identification information identifying a communication device of the slave station, multiple pieces of terminal device identification information respectively identifying the plurality of terminal devices communicating with the communication device, a challenge generated by the communication device, and a response respectively generated by the plurality of terminal devices using the respective terminal device unique keys with respect to the challenge;
a device key generation unit for generating a communication device unique key of the communication device using the communication device identification information included in the key request, and generating the terminal device unique keys for the plurality of terminal devices using the multiple pieces of terminal device identification information included in the key request;
an authentication information verification unit for verifying the challenge and the response using the generated terminal device unique keys;
a common key generation unit for generating a common key shared by the communication device and the plurality of terminal devices when verification is successful by the authentication information verification unit;
an encrypted common key generation unit for generating an encrypted common key obtained by encrypting the common key with the communication device unique key and encrypting the common key with the terminal device unique keys for the plurality of terminal devices;
a key response generation unit for generating a key response including the encrypted common key; and
a transmitting unit for transmitting the key response to the communication device.

2. The key management system according to claim 1, wherein
the key management apparatus and the plurality of terminal devices are manufactured by a plurality of manufacturers and the key management system is configured by combining the devices, and
the common key generation unit generates a first manufacturer reproduction key using first manufacturer identification information identifying a manufacturer of the terminal device included in the key request, generates the communication device unique key using the first manufacturer reproduction key and the communication device identification information included in the key request, generates a plurality of manufacturer reproduction keys using multiple pieces of manufacturer identification information for respectively identifying the manufacturers of the plurality of terminal devices included in the key request, and generates the terminal device unique keys for the plurality of terminal devices using the plurality of manufacturer reproduction keys and the multiple pieces of terminal device identification information included in the key request.

3. The key management system according to claim 1, wherein in the response,
the first terminal device generates a first response by encrypting the challenge with a first terminal device unique key,
the second terminal device generates a second response by encrypting the first response with a second terminal device unique key,
further, the same process is sequentially performed by the plurality of terminal devices until an N-th terminal device generates an N-th response by encryption with an N-th terminal device unique key, and
the N-th response is transmitted to the master station.

4. The key management system according to claim 2, wherein in the response,
the first terminal device generates a first response by encrypting the challenge with a first terminal device unique key,
the second terminal device generates a second response by encrypting the first response with a second terminal device unique key,
further, the same process is sequentially performed by the plurality of terminal devices until an N-th terminal device generates an N-th response by encryption with an N-th terminal device unique key, and
the N-th response is transmitted to the master station.

5. The key management system according to claim 3, wherein
the authentication information verification unit generates a challenge by decrypting the response included in the key request by sequentially using the N-th terminal device unique key to the first terminal device unique key which are generated by the common key generation unit, and
verifies whether the generated challenge matches the challenge included in the key request.

6. The key management system according to claim 1, wherein in the response,
the first terminal device generates a first authentication code for the challenge with the first terminal device unique key,
the second terminal device generates a second authentication code for the first authentication code with the second terminal device unique key,
further, the same process is sequentially performed by the plurality of terminal devices until an N-th terminal device generates an N-th authentication code with an N-th terminal device unique key, and
the N-th authentication code is included in the response.

7. The key management system according to claim 6, wherein
the authentication information verification unit generates an authentication code by sequentially using the first terminal device unique key to the N-th terminal device unique key which are generated by the common key generation unit, and
verifies whether the generated authentication code matches the response included in the key request.

8. A communication device sharing a key between first to N-th terminal devices provided in a product, wherein the communication device has configuration information storing network information of each of the first to N-th terminal devices, and comprises:
an information request unit for generating an information request and transmitting the information request to the first terminal device with reference to the configuration information;
a receiving unit for receiving an information response to the information request from the N-th terminal device;
a common key request unit for generating a key request from the information response and transmitting the key request to a key management apparatus;
a receiving unit for receiving an encrypted common key to the key request from the key management apparatus;
a common key decryption unit for decrypting a first encrypted common key included in the encrypted common key using a communication device unique key of the communication device and obtaining the common key; and
a common key distribution unit for transmitting other encrypted common keys included in the encrypted common key to the first to N-th terminal devices with reference to the configuration information.

9. The communication device according to claim 8, wherein
the information request includes a challenge generated by the communication device and the configuration information,
the information response includes first to N-th pieces of terminal device identification information for respectively identifying the first to N-th terminal devices, and a response respectively generated by the first to N-th terminal devices using the respective terminal device unique keys with respect to the challenge, and
the key request includes the challenge, the response, communication device identification information for identifying the communication device, and the first to N-th pieces of terminal device identification information.

10. The communication device according to claim 9, wherein in the response,
the first terminal device generates a first response by encrypting the challenge with a first terminal device unique key,
the second terminal device generates a second response by encrypting the first response with a second terminal device unique key,
further, the same process is sequentially performed in each of the terminal devices until an N-th terminal device generates an N-th response by encryption with an N-th terminal device unique key, and
the N-th response is included in the response.

11. The communication device according to claim 9, wherein in the response,
the first terminal device generates a first authentication code for the challenge with a first terminal device unique key,
the second terminal device generates a second authentication code for the first authentication code with a second terminal device unique key,
further, the same process is sequentially performed in each of the terminal devices until the N-th terminal device generates an N-th authentication code with an N-th terminal device unique key, and
the N-th authentication code is included in the response.

12. The communication device according to claim 8, wherein
the plurality of terminal devices are formed to be divided into a plurality of domains,
the communication device
includes, for each of the domains, configuration information storing network information of each of the plurality of terminal devices present in the domain, and
is configured to perform, for each of the domains, transmission of the information request by the information request unit, transmission of the key request by the common key request unit, decryption of the common key by the common key decryption unit, and transmission of the encrypted common key by the common key distribution unit.

13. A key sharing method for sharing keys between a slave station having a communication device and first to N-th terminal devices and a master station communicating with the slave station via a network, wherein
the communication device generates an information request and transmits it to the first terminal device,
the first terminal device generates a first information response to the information request and transmits it to the second terminal device,
further, the same process is sequentially performed in each of the terminal devices, and the N-th terminal device generates an N-th information response and transmits it to the communication device,
the communication device generates a key request from the N-th information response and transmits it to a key management apparatus,
the key request includes communication device identification information for identifying the communication device, first to N-th pieces of terminal device identification information for respectively identifying the first to N-th terminal devices communicating with the communication device, a challenge generated by the communication device, and a response respectively generated by the first to N-th terminal devices using the respective terminal device unique keys with respect to the challenge,
the key management apparatus generates a communication device unique key of the communication device using the communication device identification information included in the key request, generates the terminal device unique keys of the first to N-th terminal devices using the first to N-th pieces of terminal device identification information included in the key request, verifies the challenge and the response using the generated terminal device unique keys, and if the verification is successful, generates a common key shared by the communication device and the first to N-th terminal devices and encrypts the generated common key with the communication device unique key, and encrypts the common key with the terminal device unique key of the first to N-th terminal devices to generate an encrypted common key, generates a key response including the encrypted common key, and transmits it to the communication device,
the communication device decrypts the encrypted common key for the communication device with the communication device unique key and obtains the common key,
transmits the encrypted common key to the first to N-th terminal devices, and
each of the first to N-th terminal devices decrypts the encrypted common key for each of the first to N-th terminal devices with its terminal device unique key and obtains the common key.

14. The key sharing method according to claim 13, wherein
the key management apparatus and the first to N-th terminal devices are manufactured by a plurality of manufacturers, and
the key management apparatus generates a first manufacturer reproduction key using first manufacturer identification information identifying a manufacturer of the communication device included in the key request, generates the communication device unique key using the first manufacturer reproduction key and the communication device identification information included in the key request, generates a plurality of manufacturer reproduction keys using multiple pieces of manufacturer identification information for respectively identifying the manufacturers of the first to N-th terminal devices included in the key request, and generates the terminal device unique keys of the first to N-th terminal devices using the plurality of manufacturer reproduction keys and the first to N-th pieces of terminal device identification information included in the key request.

15. The key sharing method according to claim 13, wherein in the response included in the key request,
the first terminal device generates a first response by encrypting the challenge with a first terminal device unique key,
the second terminal device generates a second response by encrypting the first response with a second terminal device unique key,
further, the same process is sequentially performed in each of the terminal devices until the N-th terminal device generates an N-th response by encryption with an N-th terminal device unique key, and
the N-th response is included in the response.

16. The key sharing method according to claim 14, wherein in the response included in the key request,
the first terminal device generates a first response by encrypting the challenge with a first terminal device unique key,
the second terminal device generates a second response by encrypting the first response with a second terminal device unique key,
further, the same process is sequentially performed in each of the terminal devices until the N-th terminal device generates an N-th response by encryption with an N-th terminal device unique key, and
the N-th response is included in the response.

17. The key sharing method according to claim 15, wherein
the key management apparatus generates a challenge by respectively decrypting the response included in the key request by sequentially using the generated N-th terminal device unique key to the generated first terminal device unique key, and
verifies whether the generated challenge matches the challenge included in the key request.

18. The key sharing method according to claim 13, wherein in the response,
the first terminal device generates a first authentication code for the challenge with a first terminal device unique key,
the second terminal device generates a second authentication code for the first authentication code with a second terminal device unique key,
further, the same process is sequentially performed in each of the terminal devices until the N-th terminal device generates an N-th authentication code with an N-th terminal device unique key, and
the N-th authentication code is included in the response.

19. The key sharing method according to claim 18, wherein
the key management apparatus generates an authentication code for the challenge included in the key request by sequentially using the first terminal device unique key to the generated N-th terminal device unique key, and
verifies whether the generated authentication code matches the response included in the key request.

20. The key sharing method according to claim 13, wherein
the plurality of terminal devices are formed to be divided into a plurality of domains, and
the communication device is configured to perform, for each of the domains, transmission of the information request, transmission of the key request, decryption of the common key, and transmission of the encrypted common key.

* * * * *